United States Patent
Lee et al.

(10) Patent No.: US 11,715,439 B2
(45) Date of Patent: Aug. 1, 2023

(54) DYNAMICALLY CONTROLLING DISPLAY MODE OF EXTERNAL DEVICE COUPLED TO USER EQUIPMENT

(71) Applicant: KT CORPORATION, Gyeonggi-do (KR)

(72) Inventors: Jung-Wook Lee, Gyeonggi-do (KR); You-Jin Kang, Seoul (KR); Seung-Woo Lee, Seoul (KR); Jae-Uk Cha, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/463,978

(22) Filed: Sep. 1, 2021

(65) Prior Publication Data
US 2021/0398504 A1     Dec. 23, 2021

Related U.S. Application Data

(63) Continuation of application No. 13/726,404, filed on Dec. 24, 2012, now abandoned.

(30) Foreign Application Priority Data

Dec. 23, 2011 (KR) .................. 10-2011-0141016

(51) Int. Cl.
*G09G 5/00* (2006.01)
*H04N 21/431* (2011.01)
(Continued)

(52) U.S. Cl.
CPC .......... *G09G 5/003* (2013.01); *H04N 21/4122* (2013.01); *H04N 21/42204* (2013.01);
(Continued)

(58) Field of Classification Search
CPC ......... H04N 21/4424; H04N 21/44227; H04N 21/431; H04N 21/4363; H04N 21/4316;
(Continued)

(56) References Cited

U.S. PATENT DOCUMENTS 5,832,471 A   11/1998   Fukui
5,875,312 A   2/1999   Walsh et al.
(Continued)

FOREIGN PATENT DOCUMENTS

JP   2000-163361 A   6/2000
JP   2003-316563 A   11/2003
(Continued)

OTHER PUBLICATIONS

Daniel Lawson NPL Oct. 2011—How to turn off notification; src: http://apple.stackexchange.com/questions/28883/how-can-i-turn-off-push-notifications-for-individual-apps-in-ios-5; obtained date: Aug. 26, 2014.
(Continued)

*Primary Examiner* — Yaron Cohen
(74) *Attorney, Agent, or Firm* — IP Legal Services, LLC

(57) ABSTRACT

Described embodiments provide a method and user equipment for dynamically controlling a display mode of an external device coupled to user equipment. The method may include determining whether to detect connection to an external device and upon the detection of the connection, controlling the coupled external device to display image data produced in the user equipment on a display unit of the coupled external device in a display mode different from a display mode of the user equipment.

19 Claims, 9 Drawing Sheets

(51) Int. Cl.
  *H04N 21/442* (2011.01)
  *H04N 21/41* (2011.01)
  *H04N 21/4363* (2011.01)
  *H04N 21/422* (2011.01)
  *G06F 3/14* (2006.01)
  *G09G 5/14* (2006.01)

(52) U.S. Cl.
  CPC ....... *H04N 21/431* (2013.01); *H04N 21/4316* (2013.01); *H04N 21/4363* (2013.01); *H04N 21/4424* (2013.01); *H04N 21/44227* (2013.01); *G06F 3/1454* (2013.01); *G09G 5/14* (2013.01)

(58) Field of Classification Search
  CPC ......... H04N 21/4122; H04N 21/42204; G09G 5/003; G09G 5/14; G06F 3/1454
  See application file for complete search history.

(56) References Cited

U.S. PATENT DOCUMENTS

| | | |
|---|---|---|
| 6,286,066 B1 | 9/2001 | Hayes et al. |
| 6,401,157 B1 | 6/2002 | Nguyen et al. |
| 6,516,367 B1 | 2/2003 | Barenys et al. |
| 6,535,947 B1 | 3/2003 | Amoni et al. |
| 6,600,840 B1 | 7/2003 | McCrossin et al. |
| 6,697,892 B1 | 2/2004 | Laity et al. |
| 6,804,740 B1 | 10/2004 | Watts, Jr. |
| 6,862,724 B1 | 3/2005 | Riley et al. |
| 6,915,368 B2 | 7/2005 | Lin |
| 6,934,788 B2 | 8/2005 | Laity et al. |
| 7,076,536 B2 | 7/2006 | Chiloyan et al. |
| 7,117,388 B2 | 10/2006 | Arimilli et al. |
| 7,165,109 B2 | 1/2007 | Chiloyan et al. |
| 7,196,676 B2 | 3/2007 | Nakamura et al. |
| 7,199,787 B2 | 4/2007 | Lee et al. |
| 7,228,366 B2 | 6/2007 | Abramson et al. |
| 7,266,779 B2 | 9/2007 | Baek et al. |
| 7,312,764 B2 | 12/2007 | Driver et al. |
| 7,386,868 B2 | 6/2008 | McCormack |
| 7,533,408 B1 | 5/2009 | Arnouse |
| 7,685,322 B2 | 3/2010 | Bhesania et al. |
| 7,853,944 B2 | 12/2010 | Choe |
| 7,884,836 B2 | 2/2011 | Hussain |
| 8,214,545 B2 | 7/2012 | Khan et al. |
| 8,250,277 B2 | 8/2012 | Tseng et al. |
| 8,281,366 B1 | 10/2012 | McCorkendale et al. |
| 2002/0083228 A1 | 6/2002 | Chiloyan et al. |
| 2002/0121548 A1 | 9/2002 | Lu |
| 2003/0231142 A1 | 12/2003 | Nakamura et al. |
| 2004/0006690 A1 | 1/2004 | Du et al. |
| 2004/0160193 A1 | 8/2004 | Cha et al. |
| 2004/0210321 A1 | 10/2004 | Hayashi et al. |
| 2004/0218036 A1 | 11/2004 | Boss et al. |
| 2004/0257385 A1 | 12/2004 | Kim et al. |
| 2004/0266425 A1 | 12/2004 | Gonsalves et al. |
| 2005/0068252 A1 | 3/2005 | Driver et al. |
| 2005/0257052 A1 | 11/2005 | Asai et al. |
| 2006/0036788 A1 | 2/2006 | Galang et al. |
| 2006/0132473 A1 | 6/2006 | Fuller et al. |
| 2006/0190652 A1 | 8/2006 | Keely et al. |
| 2007/0077965 A1 | 4/2007 | Fox |
| 2007/0171239 A1 | 7/2007 | Hunt et al. |
| 2007/0239844 A1 | 10/2007 | Yokoyama et al. |
| 2007/0245398 A1 | 10/2007 | Roden |
| 2007/0257927 A1 | 11/2007 | Sakanishi et al. |
| 2008/0144051 A1 | 6/2008 | Voltz et al. |
| 2008/0152305 A1 | 6/2008 | Ziegler |
| 2008/0225013 A1 | 9/2008 | Muylkens et al. |
| 2008/0303746 A1 | 12/2008 | Schlottmann et al. |
| 2009/0049554 A1 | 2/2009 | Vuong et al. |
| 2009/0109822 A1 | 4/2009 | Hung |
| 2009/0163139 A1 | 6/2009 | Wright-Riley |
| 2009/0178097 A1 | 7/2009 | Kim et al. |
| 2009/0231485 A1 | 9/2009 | Steinke |
| 2010/0064228 A1* | 3/2010 | Tsern ................... G06F 3/0412 715/740 |
| 2010/0064248 A1 | 3/2010 | Lee et al. |
| 2010/0066698 A1 | 3/2010 | Seo |
| 2010/0153501 A1 | 6/2010 | Gabriel et al. |
| 2010/0251243 A1 | 9/2010 | Gill et al. |
| 2010/0265652 A1 | 10/2010 | Agata et al. |
| 2010/0318709 A1 | 12/2010 | Bell et al. |
| 2011/0034242 A1 | 2/2011 | Aronzon et al. |
| 2011/0037711 A1 | 2/2011 | Siddiqui et al. |
| 2011/0083140 A1 | 4/2011 | Kim et al. |
| 2011/0098087 A1 | 4/2011 | Tseng |
| 2011/0102554 A1 | 5/2011 | Saito et al. |
| 2011/0134047 A1 | 6/2011 | Wigdor et al. |
| 2011/0138327 A1 | 6/2011 | Scott et al. |
| 2011/0202872 A1 | 8/2011 | Park |
| 2011/0275391 A1 | 11/2011 | Lee et al. |
| 2011/0285916 A1 | 11/2011 | Takiduka |
| 2011/0296308 A1 | 12/2011 | Yi |
| 2011/0306389 A1 | 12/2011 | Nagayama |
| 2012/0011451 A1 | 1/2012 | Bansal et al. |
| 2012/0050183 A1 | 3/2012 | Lee |
| 2012/0050331 A1 | 3/2012 | Kanda |
| 2012/0062479 A1 | 3/2012 | Feldstein et al. |
| 2012/0081311 A1 | 4/2012 | Sirpal et al. |
| 2012/0081312 A1* | 4/2012 | Sirpal ................... G06F 1/1677 345/1.3 |
| 2012/0084542 A1 | 4/2012 | Reeves et al. |
| 2012/0088548 A1* | 4/2012 | Yun ................... G08C 23/04 455/557 |
| 2012/0117167 A1 | 5/2012 | Sadja et al. |
| 2012/0155325 A1 | 6/2012 | Eichen et al. |
| 2012/0155454 A1 | 6/2012 | Eichen et al. |
| 2012/0172088 A1 | 7/2012 | Kirch et al. |
| 2012/0242510 A1 | 9/2012 | Choi et al. |
| 2012/0280907 A1 | 11/2012 | Masaki et al. |
| 2012/0297207 A1 | 11/2012 | Carlsen et al. |
| 2012/0324041 A1 | 12/2012 | Gerber et al. |
| 2013/0033414 A1 | 2/2013 | Zheng et al. |
| 2013/0089202 A1 | 4/2013 | Altmann |
| 2013/0104149 A1 | 4/2013 | Ahn et al. |
| 2014/0208276 A1 | 7/2014 | Park |

FOREIGN PATENT DOCUMENTS

| | | |
|---|---|---|
| JP | 2005-284657 A | 10/2005 |
| JP | 2006-094367 A | 4/2006 |
| JP | 2008-158342 A | 7/2008 |
| JP | 2011-142392 A | 7/2011 |
| JP | 2011-259253 A | 12/2011 |
| KR | 20-0290286 Y1 | 9/2002 |
| KR | 10-2004-0074759 A | 8/2004 |
| KR | 10-2005-0015125 A | 2/2005 |
| KR | 10-0487618 B1 | 5/2005 |
| KR | 10-2005-0096578 A | 10/2005 |
| KR | 10-2006-0018083 A | 2/2006 |
| KR | 10-2008-0027813 A | 3/2008 |
| KR | 10-2009-0092337 A | 8/2009 |
| KR | 10-2010-0032660 A | 3/2010 |
| KR | 10-2010-0039592 A | 4/2010 |
| KR | 10-2010-0108885 A | 10/2010 |
| KR | 20-2010-0009920 U | 10/2010 |
| KR | 10-2010-0128630 A | 12/2010 |
| KR | 10-2010-0133243 A | 12/2010 |
| KR | 10-2011-0030963 A | 3/2011 |
| KR | 10-1017866 B1 | 3/2011 |
| KR | 10-2011-0057930 A | 6/2011 |
| KR | 10-2011-0093541 A | 8/2011 |
| KR | 10-2011-0111857 A | 10/2011 |
| KR | 10-2011-0115489 A | 10/2011 |
| KR | 10-2011-0123348 A | 11/2011 |

(56) References Cited

FOREIGN PATENT DOCUMENTS

KR    10-2011-0131439 A    12/2011
KR    10-2011-0134495 A    12/2011

OTHER PUBLICATIONS

MS Office 2007: Turn alrt on or off; src: https//support office.com/en-ie/article/Turn-Desktop-Alerts-on-or-off-a83fe224-3109-4de0-a1ab-c33fd103a422; obtained date: Jan. 5, 2015.

* cited by examiner

DYNAMICALLY CONTROLLING DISPLAY MODE OF EXTERNAL DEVICE COUPLED TO USER EQUIPMENT

CROSS REFERENCE TO PRIOR APPLICATIONS

The present application is a Continuation of U.S. patent application Ser. No. 13/726,404 (filed on Dec. 24, 2012), which claims priority under 35 U.S.C. § 119 to Korean Patent Application No. 10-2011-0141016 (filed on Dec. 23, 2011).

The subject matter of this application is related to U.S. patent application Ser. No. 13/540,112 filed Jul. 2, 2012, U.S. patent application Ser. No. 13/539,929 filed Jul. 2, 2012, U.S. patent application Ser. No. 13/460,091 filed Apr. 30, 2012, U.S. patent application Ser. No. 13/598,741 filed Aug. 30, 2012, U.S. patent application Ser. No. 13/726,361 filed Dec. 24, 2012, U.S. patent application Ser. No. 13/726,811 filed Dec. 26, 2012, U.S. patent application Ser. No. 13/726,830 filed Dec. 26, 2012, U.S. patent application Ser. No. 13/726,384 filed Dec. 24, 2012, and U.S. patent application Ser. No. 13/726,422 filed Dec. 24, 2012, the teachings of which are incorporated herein their entirety by reference.

FIELD OF THE INVENTION

The present invention relates to user equipment and, in particular, to dynamically controlling a display mode of an external device coupled to user equipment.

BACKGROUND OF THE INVENTION

User equipment has advanced so as to perform multiple functions such as communicating voice and data with others; exchanging text messages or multimedia messages; sending e-mails; capturing a still or moving image; playing back a music or a video file, playing a game, and a receiving a broadcast signal. Lately, such multi-functional user equipment has received greater attention for new applications. Instead of using multiple independent devices, a user prefers to use single multifunction-enabled user equipment. Portability and/or mobility should be considered in design of user equipment, but such user equipment has limitations in size. Accordingly, there also are limitations in display screen size, screen resolution, and speaker performance.

In order to overcome such limitations, an external device having a large display size, better speaker performance, and connectable to a mobile terminal has been introduced. Such external device connected to the mobile terminal can provide data, music files, and other content stored in the mobile terminal in better performance.

For example, user equipment is coupled to an external device having a larger display area and displays a mirrored screen that is exactly same as a screen displayed on user equipment. Due to a comparatively small display area of the user equipment, the user equipment may be designed to display only one application window of currently running application. Such a display mode may be referred to as a single display mode. Since the display unit of the coupled external device is typically controlled as the single display mode, the benefit of using the larger display area of the coupled external device may be not maximized.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a display mode of an external device may be controlled dynamically according to a display size of the external device when the external device is coupled to user equipment.

In accordance with another aspect of the present invention, user equipment may control an external device to display image data in a multiscreen display mode when user equipment is coupled to the external device.

In accordance with at least one embodiment of the present invention, a method of a user equipment may be provided for dynamically controlling a display mode of an external device coupled to user equipment. The method may include determining whether to detect connection to an external device and upon the detection of the connection, controlling the coupled external device to display image data produced in the user equipment on a display unit of the coupled external device in a display mode different from a display mode of the user equipment.

The display mode of the coupled external device may be a multiscreen display mode and the display mode of the user equipment may be a single screen display mode.

The controlling may include creating image data in a multiscreen mode display setting associated with applications running in a multitasking mode of the user equipment and information on the coupled external device, transmitting the created image data to the coupled external device, and controlling the external device to display the transmitted image data in a multiscreen display mode based on the associated multiscreen mode display setting.

The controlling may include determining whether a display size of the coupled external device is greater than a reference display size upon the detection of the connection. When the display size of the coupled external device is determined as being greater than a reference display size, the controlling may include controlling the coupled external device to display the image data produced by the user equipment on the display unit of the coupled external device in a multiscreen display mode.

The controlling may include determining whether a display size of the coupled external device is greater than a reference display size upon the detection of the connection, determining a number of applications running in a multitasking mode of the user equipment when the display size of the coupled external device is determined as being greater than a reference display size, obtaining a multiscreen mode display setting of the coupled external device based on the determined number of applications running in a multitasking mode of the user equipment and information on the coupled external device, and controlling the coupled external device to display the produced image data on the display unit of the coupled external device in a multiscreen display mode based on the obtained multiscreen mode display setting.

The method may further include establishing a host-device connection between the user equipment and the coupled external device and setting a host-device connection display setting based on information on a display unit of the coupled external device upon the detection of the connection, creating image data as a result of running an application in the user equipment based on the host-device connection display setting, transmitting the created image data to the coupled external device and controlling the coupled external device to display the transmitted image data in a single screen mode, determining whether a user input is received for activating one of applications installed in the user equipment, upon the receipt of the user input for activating, creating image data of the currently activated application, creating multiscreen image data by combining the created image data of the currently activated application and the created image data of the running application based on an associated multiscreen mode display setting, and transmitting the created multiscreen image data to the external device. In this case, the controlling may include controlling the coupled external device to display the transmitted multiscreen image data in a dual screen display mode based on the associated multiscreen mode display setting.

The method may further include establishing a host-device connection between the user equipment and the coupled external device upon the detection of the connection, determining whether a display size of the coupled external device is greater than a reference display size upon the detection of the connection, determining a number of applications running in a multitasking mode of the user equipment when the display size of the coupled external device is greater than a reference display size, and obtaining a multiscreen mode display setting based on the determined number of applications running in a multitasking mode of the user equipment and information on the coupled external device. In this case, the controlling may includes creating multiscreen image data by combining image data produced by each application running in the multitasking mode of the user equipment based on the obtained multiscreen mode display setting, transmitting the created multiscreen image data to the coupled external device, and controlling the coupled external device to display the transmitted multiscreen mode image data in a multiscreen display mode based on the obtained multiscreen mode display setting.

The method may further include obtaining a multiscreen mode display setting based on a number of applications running in the user equipment and information on the coupled external device. The multiscreen mode display setting may include at least one of information on a number of application windows in the multiscreen display mode, a maximum number of allowed application windows, a display size of each application window, a position and a display orientation of each application window, arrangement of each application window, control menus and icons for controlling an overall graphic user interface of the multiscreen display mode and each application window, arrangement and sizes of the control menus and icons.

The obtaining may include retrieving, from a memory of the user equipment, the multiscreen mode display setting associated with the number of multitasking applications running in the user equipment and the information on the coupled external device. In this case, information on the multiscreen mode display setting may be stored in a form of a lookup table in the memory of the user equipment.

The obtaining may include determining the multiscreen mode display setting based on the number of multitasking application running in the user equipment and the information on the coupled external device.

The method may further include determining whether an user input is received for activating a new application after controlling the coupled external device to display image data produced in the user equipment in the multiscreen display mode, upon the receipt of the user input for activating a new application, interrupting creating image data of one of running applications associated with the multiscreen display mode, creating image data of the newly activated application and continuously creating image data of remaining applications associated with the multiscreen display mode, creating multiscreen image data by combining the created image data of the newly activated application and the continuously created image data of the remaining applications based on an associated multiscreen mode display setting, and transmitting the created multiscreen image data to the coupled external device. In this case, the controlling may include controlling the coupled external device to display the transmitted multiscreen image data in the associated multiscreen display mode based on the associated multiscreen mode display setting.

The application interrupted to create image data may be running in a background mode.

The determining may include, upon the receipt of the user input for activating a new application, determining whether a number of application windows in a current multiscreen display mode reaches a maximum number of application windows allowed within the current multiscreen display mode. When the number of application windows in the current multiscreen display mode is smaller than the maximum number, the determining may include obtaining a multiscreen mode display setting by increasing a number of associated multitasking applications by one, creating multiscreen image data based on the newly obtained multiscreen mode display setting by additionally including image data produced by the newly activated application, and transmitting the created multiscreen image data to the coupled external device and controlling the external device to display the transmitted multiscreen image data based on the newly obtained multiscreen mode display setting.

The method may further include determining whether a user input is received for closing one of application windows in the multiscreen display mode after controlling the coupled external device to display image data produced in the user equipment in the multiscreen display mode. In this case, upon the receipt of the user input for closing one of application windows, the method may further include interrupting creating image data of the application associated with the user input, resuming one of applications running in a background mode to create image data and continuously creating image data of applications not associated with the user input, creating multiscreen image data by combining the created image data of the resumed application and the continuously created image data of the applications not associated with the user input based on an associated multiscreen mode display setting, and transmitting the created multiscreen image data to the coupled external device. In this case, the controlling may include controlling the coupled external device to display the transmitted multiscreen image data in the associated multiscreen display mode based on the associated multiscreen mode display setting.

In accordance with at least one embodiment of the present invention, a user equipment may be provided for dynamically controlling a display mode of an external device coupled thereto. The user equipment may be configured to determine whether to detect connection to an external device. Upon the detection of the connection, the user equipment may be configured to control the coupled external device to display image data produced in the user equipment on a display unit of the coupled external device in a display mode different from a display mode of the user equipment.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
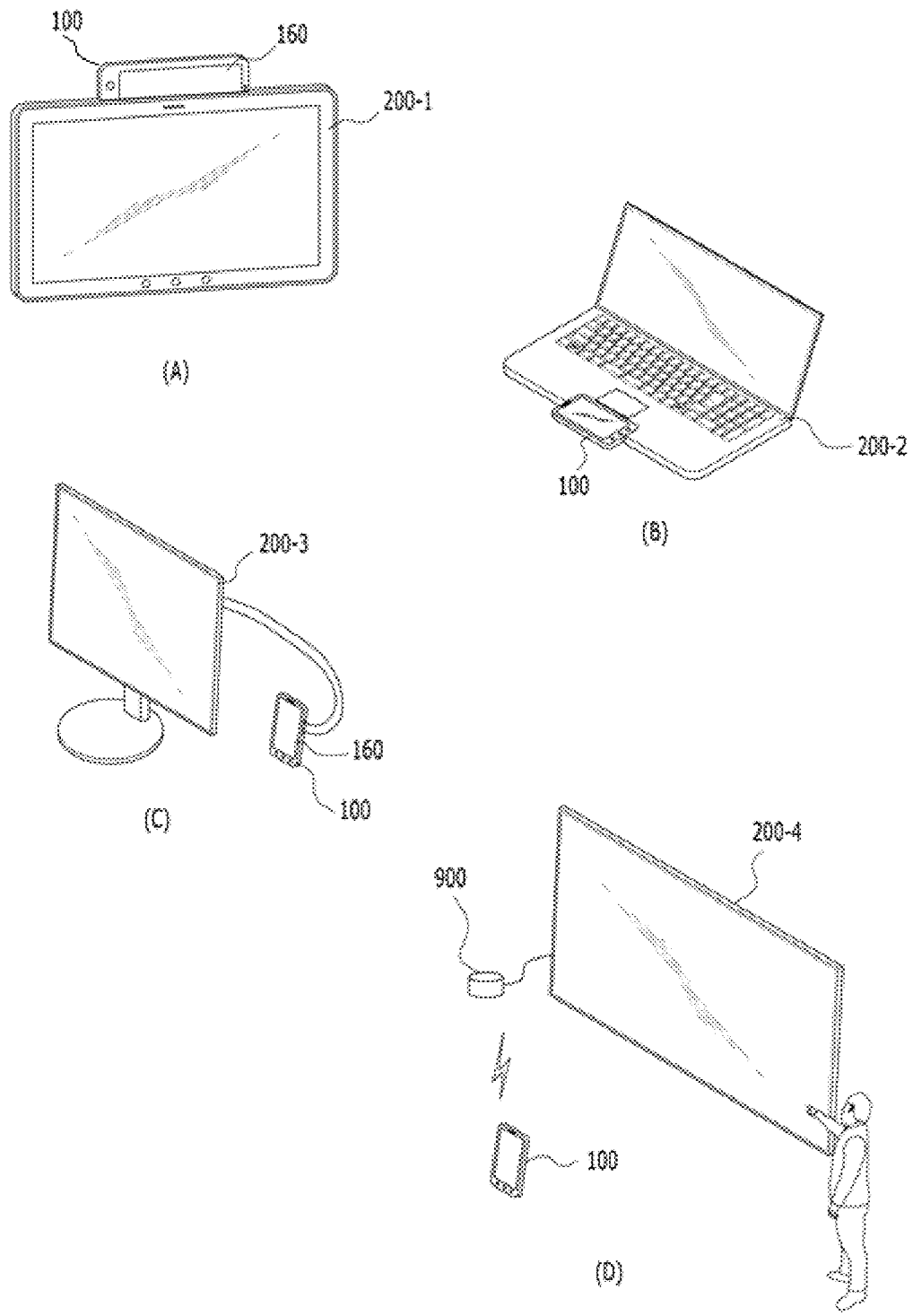
FIG. 1 shows various external devices connected to user equipment in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, user equipment may control an external device to display image data in a display mode different from that of the user equipment when user equipment is coupled to the external device. Such user equipment may be coupled to various types of external devices. The external devices will be described with reference to FIG. 1. For convenience and ease of understanding, user equipment will be described as a mobile terminal such as a mobile phone or a smart phone throughout the accompanying drawings. The present invention, however, is not limited thereto.

FIG. 1 shows various external devices connected to user equipment in accordance with at least one embodiment of the present invention.

Referring to FIG. 1, user equipment 100 is an image data source device that may be coupled to various types of external devices. For example, user equipment 100 may be coupled to pad type device 200-1 as shown in a diagram (A) and coupled to laptop type device 200-2 as shown in a diagram (B). Furthermore, user equipment 100 may be coupled to monitor 200-3 as shown in a diagram (C) and coupled to large sized screen 200-4 as shown in a diagram (D). Although not illustrated in FIG. 1, other types of devices may be coupled to user equipment 100 as an external device for displaying image data produced by user equipment 100.

Figure 3:
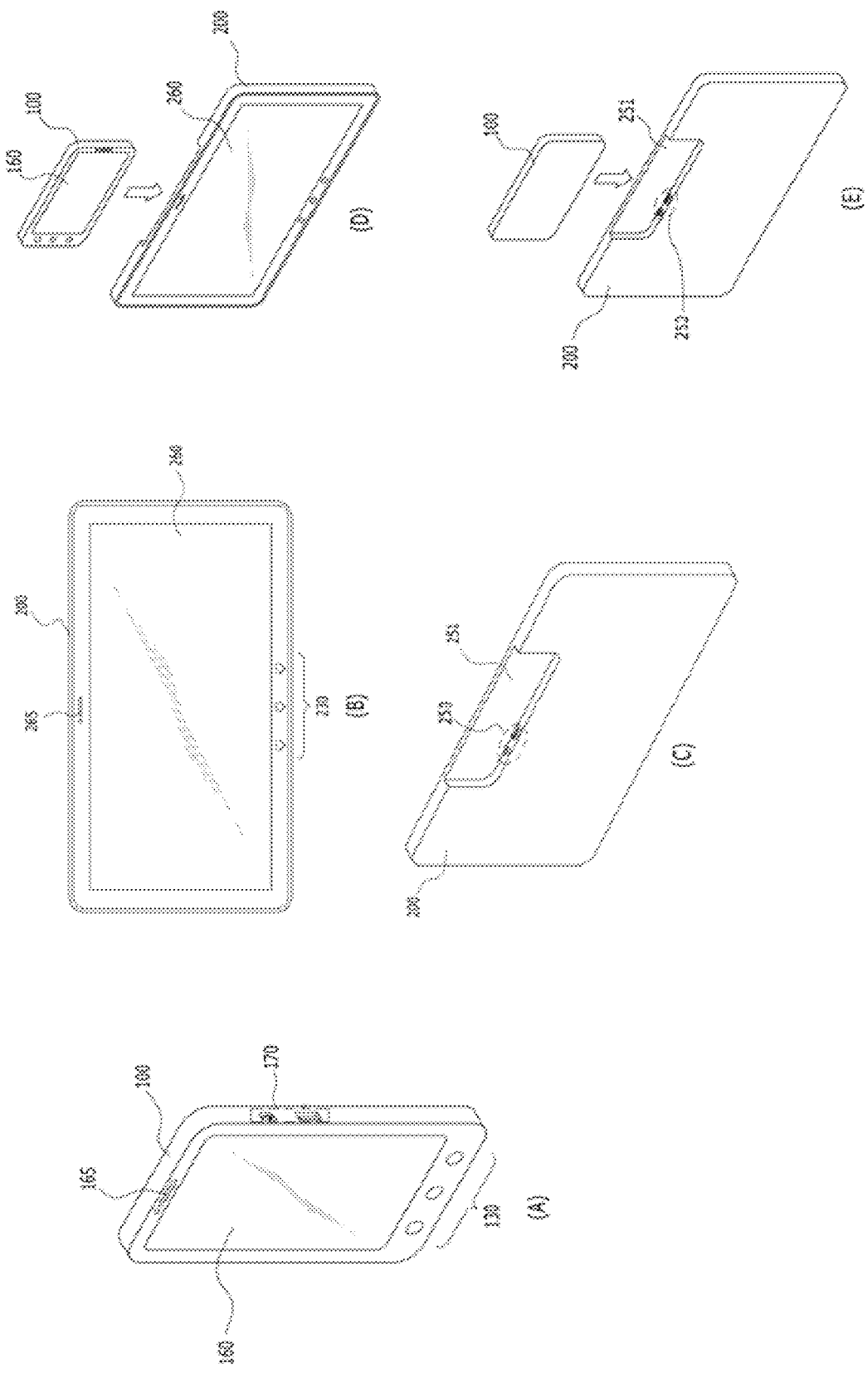
FIG. 3 shows user equipment and an external device in accordance with at least one embodiment of the present invention.
Figure 4:
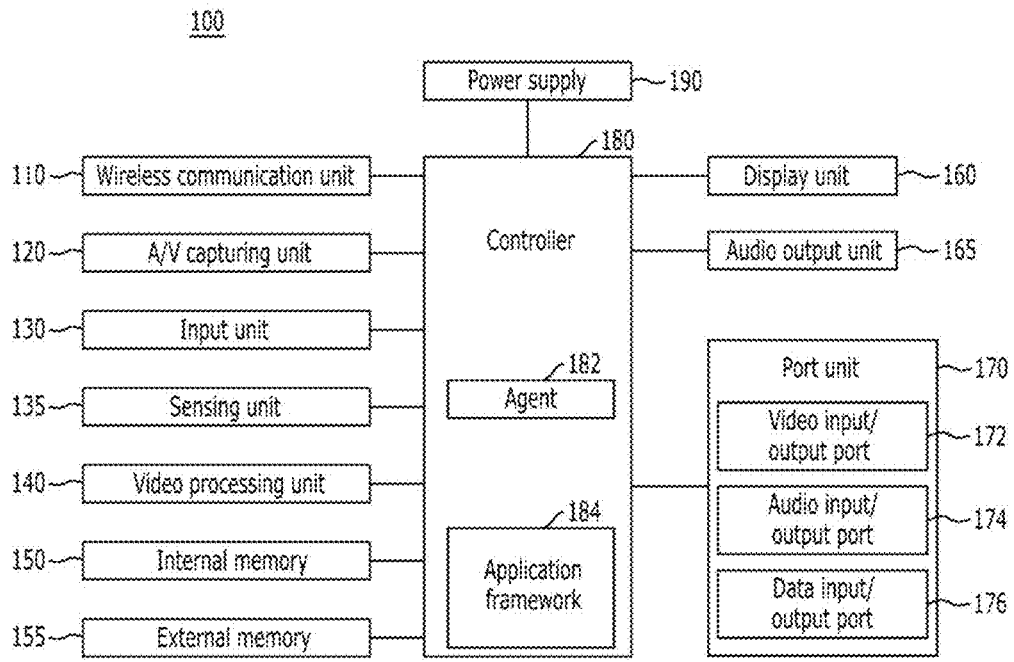
FIG. 4 is a block diagram illustrating user equipment in accordance with at least one embodiment of the present invention.

User equipment 100 may be coupled to an external device in various manners. For such connection, user equipment 100 and the external device may include input/output ports 170 and 250 (FIG. 3 and FIG. 4). For example, user equipment 100 may be docked at a docking bay of an external device. As shown in the diagrams (A) and (B), pad type device 200-1 and laptop computer 200-2 may include a docking bay specially designed to receive user equipment 100. Furthermore, user equipment 100 may be coupled to an external device through a physical cable. As shown in the diagram (C), user equipment 100 may be coupled to monitor 200-3 through a physical cable such as a video and/or audio input/output cable. In addition, user equipment 100 may be coupled to an external device through a wireless manner such as WiFi, WiFi direct, and wireless high definition multimedia interface (HDMI). As shown in the diagram (D), user equipment 100 may be coupled to large sized screen 200-4 through signal receiving device 900 for receiving an image data signal from user equipment 100 through a wireless link.

Figure 2:
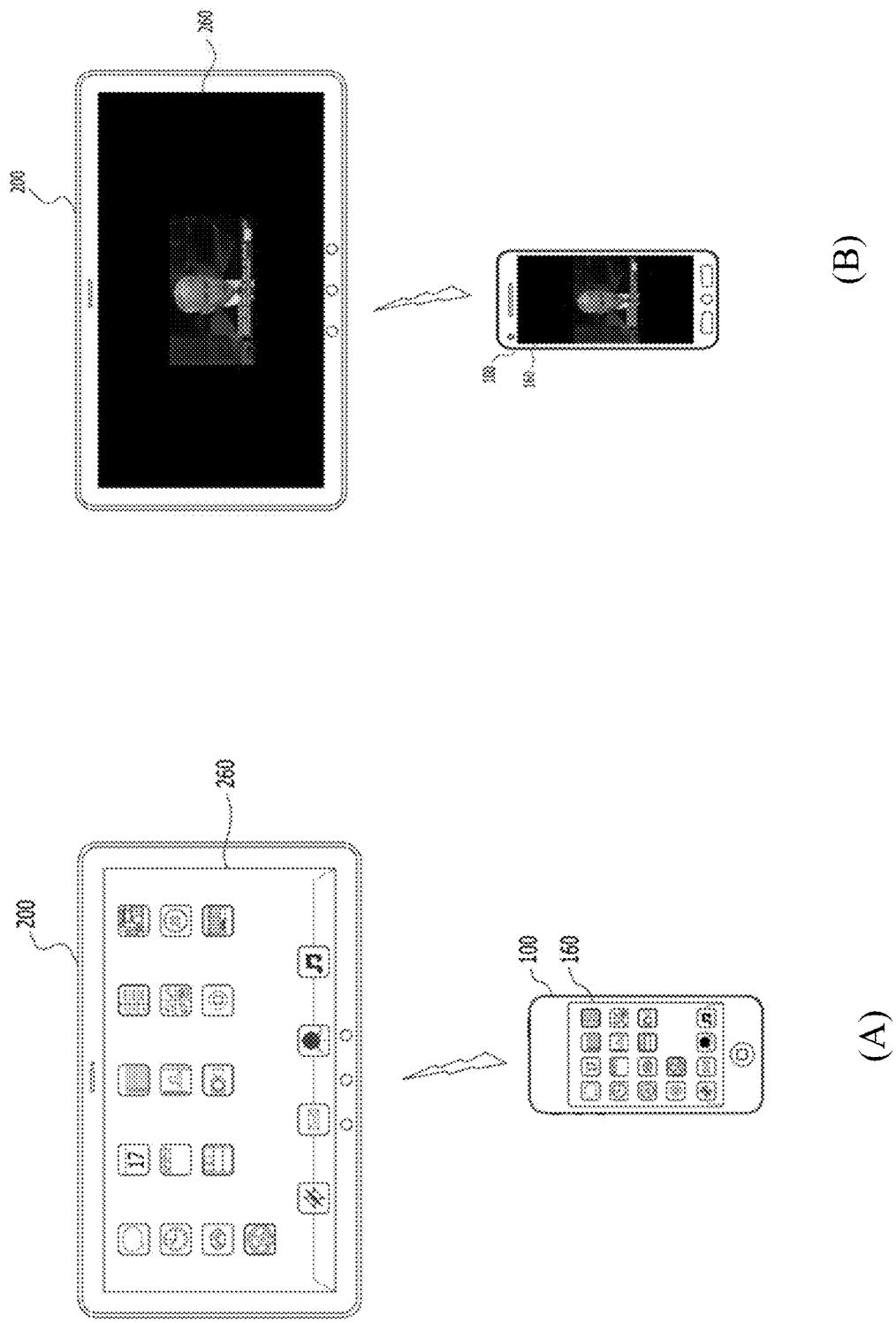
FIG. 2 shows a typical method of user equipment for controlling an external device to display image data when the user equipment is coupled to the external device.

FIG. 2 shows a typical method of user equipment for controlling an external device to display image data when the user equipment is coupled to the external device.

As shown in FIG. 2, user equipment 100 is coupled to external device 200 having a larger display size. After the connection, user equipment 100 may exchange data with external device 200 through predetermined coupling interfaces such as port units 170 and 250 (FIG. 3), but the present invention is not limited thereto. User equipment 100 may communicate with external device 200 through various manners such as wireless communication. Particularly, user equipment 100 operates as an image data source device and transfers image data produced in user equipment 100 to external device 200. External device 200 receives and displays the image data from user equipment 100 in response to the control of user equipment 100.

Typically, external device 200 displays mirrored image data that is exactly same as image data displayed on user equipment 100. Since user equipment 100 displays the image data in a single screen display mode, external device 200 displays the mirrored image data in the single screen display mode. For example, as shown in diagrams (A) and (B), user equipment 100 and external device 200 display the same screen in the single screen display mode. The diagram (A) of FIG. 2 shows a default home screen of user equipment 100. The default home screen may be a graphic user interface (GUI) produced by an operation system of user equipment 100. When user equipment 100 is initially turned on or when user equipment 100 is in an idle state, user equipment 100 displays the default home screen as shown in the diagram (A) of FIG. 2. When external device 200 is coupled to user equipment 100, external device 200 displays the same default home screen in the single screen mode because external device 200 is controlled to display the same image data produced in user equipment 100 and user equipment 100 displays the produced image data in the single display mode. When a related user activate one of applications installed in user equipment 100 for playing a moving image while external device 200 is coupled to user equipment 100, external device 200 displays image data produced by the activated application in the single screen display mode as shown in a diagram (B) of FIG. 2. External device 200 is controlled to display the same image data produced in user equipment 100 in the single display mode.

Due to such a typical way of controlling a display mode of external device 200, the benefit of using a larger display area of external device 200 is not maximized. In order to overcome such disadvantage of the typical way of controlling the display mode of external device 200, the display mode of external device 200 may be dynamically controlled according to a display size of external device 200 in accordance with at least one embodiment of the present invention. For example, user equipment 100 may control external device 200 to display image data in a multiscreen display mode when user equipment 100 is coupled to external device 200. The multiscreen display mode may be a display mode for simultaneously display at least two application windows produced as a result of performing multiple applications at the same time. That is, user equipment 100 may control external device 200 to display image data in a display mode different from that of user equipment 100 in accordance with at least one embodiment of the present invention. Such operation will be described in detail with reference to FIG. 6 to FIG. 8.

Before describing the operation, user equipment 100 and external device 200 will be described with reference to FIG. 3 to FIG. 5. For convenience and ease of understanding, user equipment will be representatively described as a mobile phone or a smart phone through the specification and an external device will be representatively described as a pad-type device or a tablet PC, but the present invention is not limited thereof.

FIG. 3 shows user equipment and an external device in accordance with at least one embodiment of the present invention.

Referring to a diagram (A) of FIG. 3, user equipment 100 may include display unit 160 and at least one port unit 170. Such port unit 170 may be referred to as an interface unit. Display unit 160 may display data according to display setting of user equipment 100. Display unit 160 may typically have about 4.5 inch display area which may be smaller than that of an external device, but the present invention is not limited thereto. For example, a display area of an external device may be smaller than that of user equipment 100.

At least one port unit 170 may be coupled to an external device and exchange data with the external device. User equipment 100 may be capable of processing data and transferring the processed data to an external device through port unit 170. Such a port unit 170 may include a high definition multimedia interface (HDMI) port and/or a universal serial bus (USB) port, but the present invention is not limited thereto. User equipment 100 may have a certain design or standardized interface connectable to an external device. For example, user equipment 100 may be attachable to and/or detachable from an external device. User equipment 100 may dock to an external device. User equipment 100 may be any electronic device that can perform the above and further operations described herein. For example, user equipment 100 may include, but is not limited to, a mobile terminal, a mobile device, a mobile phone, a portable terminal, a portable device, a handheld device, a cellular phone, a smart phone, a personal digital assistant (PDA), wireless local loop (WLL) station, a portable multimedia player (PMP), and a navigation device. The present invention, however, is not limited thereto, and other types of user equipment, such as mini-laptop PCs and other computing devices may incorporate embodiments of the present invention. User equipment 100 will be described in more detail with reference to FIG. 4.

Referring to diagrams (B) and (C) of FIG. 3, external device 200 may include display unit 260, key buttons 230, at least one pot unit 250, and speaker 265. Display unit 260 may display image data. Display unit 260 may have a display area larger than that of user equipment 100. For example, display unit 260 may have about 10.1 inch of display area. The present invention, however, is not limited thereto. External device 200 may have a display area smaller than that of user equipment 100. In accordance with at least one embodiment of the present invention, display unit 260 may display image data from user equipment 100 in a display mode different from that of user equipment 100. For example, display unit 260 may display image data in a multiscreen display mode.

At least one port unit 250 may be coupled to corresponding port unit 170 of exchanging data with user equipment 100. Accordingly, at least one port unit 270 may include a HDMI port and/or a USB port corresponding to port unit 170 of user equipment 100. External device 200 may be capable of receiving data from user equipment 100 through at least one port unit 250 and displaying the received data on display unit 260. External device 200 may have a certain design connectable to user equipment 100 through at least one port unit 250. For example, external device 200 may be attachable to and/or detachable from user equipment 100 as described above with respect to diagrams (D) and (E) of FIG. 3. External device 200 may have structure 251 for receiving and holding user equipment 100 (diagram (C) of FIG. 3). Such structure may be referred to as coupling bay 251. External device 200 may be any electronic device that can perform the above operation. For example, external device 200 may include a notebook computer, a laptop computer, a tablet PC, a pad having a touch screen, and a pad having a display unit and a keyboard, but the present invention is not limited thereto. In accordance with at least one embodiment of the present invention, external device 200 may be activated when user equipment 100 is connected to external device 200 and controlled by user equipment 100. Accordingly, external device 200 may have at least constituent elements for necessary operation performed under the control of user equipment 100.

Referring to diagrams (D) and (E) of FIG. 3, user equipment 100 may be coupled to external device in a docking manner. For example, user equipment 100 may be inserted in coupling bay 251 of external device 200 in a top-to-bottom direction and user equipment 100 may be completely inserted into coupling bay 251 of external device 200 until at least one port unit 170 of user equipment 100 is interlocked to at least one port unit 250 of external device 200. Although FIG. 3 shows that user equipment 100 is coupled with external device 200 in a docking manner, the present invention is not limited thereto. User equipment 100 may be coupled to external device 200 in other manners such as wireless connection through a radio link.

Hereinafter, user equipment 100 will be described in more detail with reference to FIG. 4. As described above, user equipment 100 may be coupled to external device 100 and control coupled external device 200 to display image data in a multiscreen display mode which is different from that of user equipment 100 in accordance with at least one embodiment of the present invention.

FIG. 4 is a block diagram illustrating user equipment in accordance with at least one embodiment of the present invention.

Referring to FIG. 4, user equipment 100 may include wireless communication unit 110, audio/video (A/V) capturing unit 120, input unit 130, sensing unit 135, video processing unit 140, internal memory 150, external memory 155, display unit 160, audio output unit 165, a port unit 170, a controller 180, and a power supply 190. Controller 180 may include an agent 182 and application framework 184. Port unit 170 may include video input/output port 172, audio input/output port 174, and data input/output port 176. Power supply unit 190 may include a battery for electric charging. User equipment 100 may be described as including the above constituent elements, but the present invention is not limited thereto.

Wireless communication unit 110 may include at least one module for communicating with other party through a wireless communication system. For example, wireless communication unit 110 may include any or all of a broadcasting signal receiving module, a mobile communication module, a wireless Internet module, a short-distance communication module, and a location information module. In accordance with an embodiment of the present invention, wireless communication unit 110 may be not an essential unit for user equipment 100 because user equipment 100 may be not required to communicate with another party. Accordingly, wireless communication unit 110 may be omitted in accordance with another embodiment of the present invention.

A/V capturing unit 120 may capture an audio signal and/or a video signal. For example, the A/V capturing unit 120 may include a camera and a microphone. The camera may process image frames of a still image or a moving image, which are captured by an image sensor in a video call mode or a photographing mode. The microphone may receive an audio signal provided externally in an on-call mode, a recording mode, or a voice recognition mode.

Input unit 130 may be a user interface for receiving input from a user. Such an input unit 130 may be realized in various types. For example, input unit 130 may include any of a keypad, a dome switch, a touch pad, a jog wheel, and a jog switch, but is not limited thereto.

In accordance with at least one embodiment of the present invention, user equipment 100 may be a full touch type smart phone. In this case, input unit 130 may include several hardware key buttons and a touch screen. The hardware key buttons may include a hold key and a volume control button. Furthermore, user equipment 100 may include a touch screen panel (not shown) as another input unit for receiving touch inputs in accordance with at least one embodiment of the present invention. The touch screen panel (not shown) may be disposed on an upper surface of display unit 160, but the present invention is not limited thereto. In accordance with at least one embodiment of the present invention, input unit 130 may be configured to receive various user inputs from a user, for example, user inputs for activating one of applications installed in user equipment 100 and for closing one of application windows within a multiscreen display mode.

Sensing unit 135 may detect a current status of user equipment 100. For example, sensing unit 135 may sense an opening or closing of a cover of user equipment 100, a location and a bearing of user equipment 100, acceleration and deceleration of user equipment 100, or physical contact with or proximity to a user. Based on the detected status of user equipment 100, sensing unit 135 may generate a sensing signal to control the operation of user equipment 100. For example, in the case of a mobile phone having a sliding type cover, sensing unit 135 may sense whether a cover is opened or closed. Sensing unit 135 may sense whether or not power supply 190 supplies power. Furthermore, sensing unit 135 may sense whether or not port unit 170 is coupled to external device 200. In this case, sensing unit 135 may receive a detection signal from port unit 170 when user equipment 100 is connected to external device 200 in accordance with an embodiment of the present invention. For example, sensing unit 135 may receive a detection signal from a hot plug detect (HPD) pin when port unit 170 includes a HDMI port. Based on the detection signal, controller 160 may determine that external device 200 is connected to user equipment 100. Upon the receipt of the detection signal, user equipment 100 may establish a host-device connection in accordance with at least one embodiment of the present invention. Such operation will be described in detail with reference to FIG. 8 in later.

Video processing unit 140 may process an image signal and/or image data under the control of controller 160. Particularly, video processing unit 140 may process image data according to a display setting determined based on display unit information of display unit 160. The display setting may include a screen size, a screen resolution, a display direction, and a dot per inch (DPI) value. The display setting may be determined by controller 180 based on display unit information of display unit 160. The display unit information may include a manufacturer, a model number, a device identifier (ID), a DPI value, a screen size, the number of pixels, supporting screen resolutions, supporting aspect ratios, refresh rates, and a response time. Video processing unit 140 may transmit the processed image data to display unit 160 of user equipment 100 in response to controller 160. Furthermore, video processing until 40 may process image data to be transmitted to external device 200 when user equipment 100 is connected to external device 200. For example, video processing unit 140 may, reconfigure image data based on a display setting of external device 200 and generate a signal based on the reconfigured image data in response to controller 180. The present invention, however, is not limited thereto. Such an operation may be performed by controller 160. The image data may be data for displaying a graphic user interface produced by any software programs installed in user equipment 100, such as an operating system and applications installed in user equipment 100.

Figure 8:
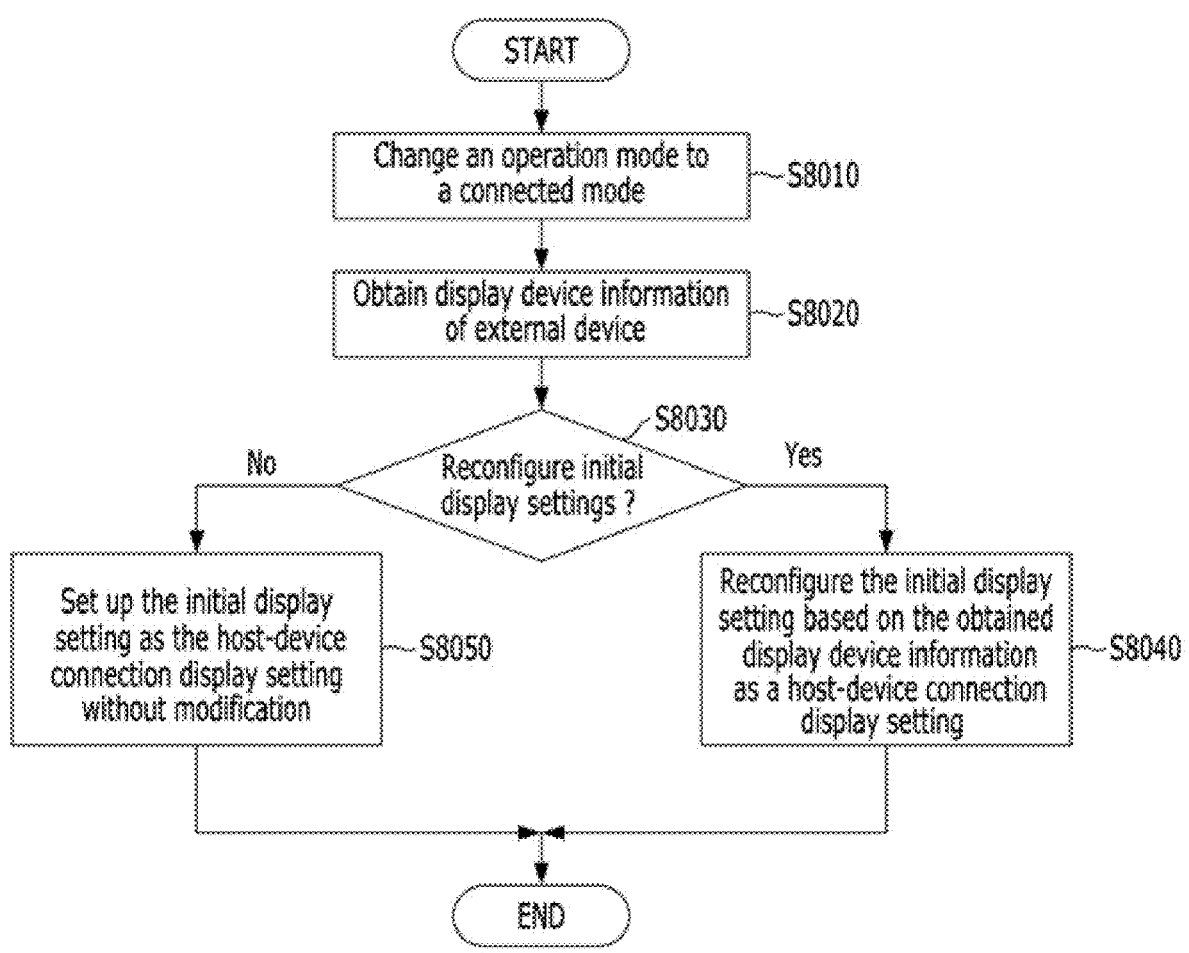
FIG. 8 shows a method for establishing host-device connection at least one embodiment of the present invention.

Internal memory 150 and external memory 155 may be used as a data storage device of user equipment 100. For example, internal memory 150 and external memory 155 may store information necessary for operating user equipment 100 and performing certain operations requested by a user. Such information may include any software programs and related data. For example, internal memory 150 and external memory 155 may store an operation system data, applications, and related data, received from an external device through a physical cable and downloaded from a related server from through a communication link. In accordance with an embodiment of the present invention, internal memory 150 and/or external memory 155 may store information on display setting determined for display unit 160 or display unit 260 of external device 200. Furthermore, internal memory 150 and external memory 155 may store device unit information for candidate external devices connectable to user equipment 100. In addition, internal memory 150 and/or external memory 150 may store a DPI table 800 as shown in FIG. 8. Internal memory 150 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. External memory 155 may be a SD card or a USB memory, but the present invention is not limited thereto. For example, external device 200 may function as external memory 155 when external device 200 is coupled to user equipment 100 in accordance with an embodiment of the present invention.

In accordance with embodiment of the present invention, at least one of internal memory 150 and external memory 155 may store external device information received from the connected external device, for example, external device 200. The external device information may include device type information and universal serial bus (USB) device information. The device type information includes information on a device type of the connected external device and the USB device information may include information on vender identification (VID) and product identification (PID) of the external device.

Furthermore, internal memory 150 and external memory 155 may store a device table and application information. The device table may include device type information mapped to USB device information. The device table may be used to obtain the external device information. The application information may include information on whether an application is required for optimally controlling and driving constituent elements of the external device, an application type, and an address of a server for obtaining the required application. The application information may be used to determine an application required for controlling constituent element of the connected external device such as external device 200.

In accordance with at least one embodiment of the present invention, internal memory 150 may store information on a coupled external device and information on multiscreen mode display settings. Such multiscreen mode display settings may be stored in a form or a mapping table or a lookup table. The multiscreen mode display setting may include at least one of information on a number of application windows in the multiscreen display mode, a maximum number of allowed application windows, a display size of each application window, a position and a display orientation of each application window, arrangement of each application window, control menus and icons for controlling an overall graphic user interface of the multiscreen display mode and each application window, arrangement and sizes of the control menus and icons.

Display unit 160 may be an output device for visually displaying information. For example, display unit 160 may display image data produced or processed by video processing unit 140 and/or controller 180. Display unit 160 may receive the image data from at least one of video processing unit 140 and controller 180 and display the received image data. The image data may be produced as a result of certain operations performed by any software programs installed in user equipment 100. For example, the image data may be data processed for displaying a graphic user interface produced by an operation system and applications, performed in user equipment 100. The applications may be referred to as App. Also, the image data may further include still images and moving images, produced or processed by video processing unit 140 and controller 180. For example, display unit 160 may be a liquid crystal display (LCD) panel or an active-matrix organic light-emitting diode (AMOLED) panel, but the present invention is not limited thereto.

In accordance with at least one embodiment of the present invention, display unit 160 may be interrupted to display the image data when user equipment 100 is connected to external device 200. For example, display unit 160 may be turned off or transit to a sleep mode in response to controller 180 when user equipment 100 is connected to external device 200. Display unit 160 may be turned on again or transit back to an operation mode in response to controller 180 when user equipment 100 is disconnected from external device 200. That is, display unit 160 may be turned off in the pointing device operation mode in accordance with embodiments of the present invention. After turning off display unit 160, controller 180 may transmit image data to external device 200 for displaying on the image data on display unit 260 of external device 200.

Audio output unit 165 may provide an output audio signal that may be produced or processed by controller 180 as a result of operations performed by an operating system and/or applications installed in user equipment 100. Audio output unit 165 may include a speaker, a receiver, and a buzzer.

Port unit 170 may include at least one port for exchanging signals and/or data with external device 200. In accordance with at least one embodiment of the present invention, port unit 170 may transfer image data and audio data from user equipment 100 to external device 200. Port unit 170 may exchange control data with external device 200. Port unit 170 may be coupled to corresponding port unit 250 of external device 200 in various coupling manners. For example, port unit 170 may be coupled to corresponding port unit 250 of external device 200 through a physical cable. Furthermore, port unit 170 may be directly interlocked with corresponding port unit 250 of external device 200. The present invention, however, is not limited thereto. Port unit 170 may be coupled to corresponding port unit 250 of external device 200 through a radio link formed between user equipment 100 and external device 200. In this case, port unit 170 and port unit 250 may include a signal transmitter and receiver (not shown) for communicating with each other using a communication protocol. Such communication protocol may be Bluetooth, but the present invention is not limited thereto.

As shown in FIG. 4, port unit 170 may include video input/output port 172, audio input/output port 174, and data input/output port 176, but the present invention is not limited thereto. Such port unit 170 may be embodied in various types. For example, port unit 170 may not include audio input/output interface 174. Further, port unit 170 may include a power port (not shown). In this case, the power port may transfer power from external device 200 to user equipment 100 when external device 200 is coupled to user equipment 100.

In accordance with an embodiment of the present invention, user equipment 100 may be coupled to external device 200 through port unit 170. After user equipment 100 coupled to external device 200, user equipment 100 may control external device 200 by exchanging data with external device 200 through port unit 170. For example, user equipment 100 may receive inputs from a user through external device 170 and transmit control data to external device 170 through port unit 170. Particularly, user equipment 100 may transmit image data through port unit 170 to external device 200 and control external device 200 to display the image data such a graphic user interface instead of display unit 160 of user equipment 100.

Controller 180 may control overall operation of the constituent elements of user equipment 100. Particularly, controller 180 may perform operations necessary for driving the constituent elements of user equipment 100 in response to inputs received from a related user. In accordance with an embodiment of the present invention, controller 180 may control overall operation of constituent elements of external device 200 when user equipment 100 is connected to external device 200. For example, controller 180 may receive inputs through external device 200, perform an operation in response to the received inputs, and provide the user with the result thereof through external device 200. Particularly, controller 180 may display image data, as a result of operation related to the user inputs, on a display unit of external device 200 when user equipment 100 is connected to external device 200.

In order to control external device 200 when user equipment 100 is connected to external device 200, controller 180 may include agent 182. Agent 182 may control operations related to connection to external device 200 and controlling external device 200. Such agent 182 may be referred to as a coupling agent or a docking agent, but the present invention is not limited thereto. Agent 182 may be implemented in software. For example, agent 182 may be realized on an application layer in an operating system (OS) structure of user equipment 100. For example, such an OS structure may be an OS structure of an Android operating system, but present invention is not limited thereto.

Agent 182 may also determine an application required for optimally controlling and driving constituent elements of external device 200. In order to determine, agent 182 may obtain external device information from external device 200. Based on the obtained external device information, agent 182 may determine whether any application required for optimally controlling the constituent elements of external device 200 and determine whether the required application is installed in user equipment 100. Agent 182 may download the required application from an associated server when the required application is not installed in user equipment 100. Such operations of agent 182 will be described in detail with reference to FIG. 7 to FIG. 9 in later.

Furthermore, controller 180 may include application framework 184. Application framework 184 may be an application framework layer of the OS structure and implemented in software. In accordance with an embodiment of the present invention, application framework 184 may perform operations for controlling a display setting in response to associated applications producing image data when user equipment 100 is connected to external device 200. Application framework 184 may cooperate with agent 182 for controlling constituent elements of external device 200.

In accordance with embodiments of the present invention, controller 180 may control overall operation for dynamically controlling an external device to display image data in a display mode different from that of the user equipment when the user equipment is connected to the external device. For example, controller 180 may determine whether to detect connection to an external device based on the detection signal generated by port unit 170. Upon the detection of the connection, controller 180 may control the coupled external device to display image data produced in user equipment 100 on a display unit of the coupled external device in a display mode different from a display mode of the user equipment. Particularly, controller 180, in cooperation with video processing unit 140, may create image data in a multiscreen mode display setting associated with applications running in a multitasking mode and information on the coupled external device. Controller 180 may transmit the created image data to the coupled external device and control the external device to display the transmitted image data in a multiscreen mode display setting based on the associated multiscreen mode display setting. Such operation of controller 180 will be described in detail with reference to FIG. 6 to FIG. 8.

As described, external device 200 may be coupled to user equipment 100 and may be controlled to display image data in a multiscreen display mode which is different than that of user equipment 100 in accordance with at least one embodiment of the present invention. Hereinafter, external device 200 will be described in detail with reference to FIG. 5.

Figure 5:
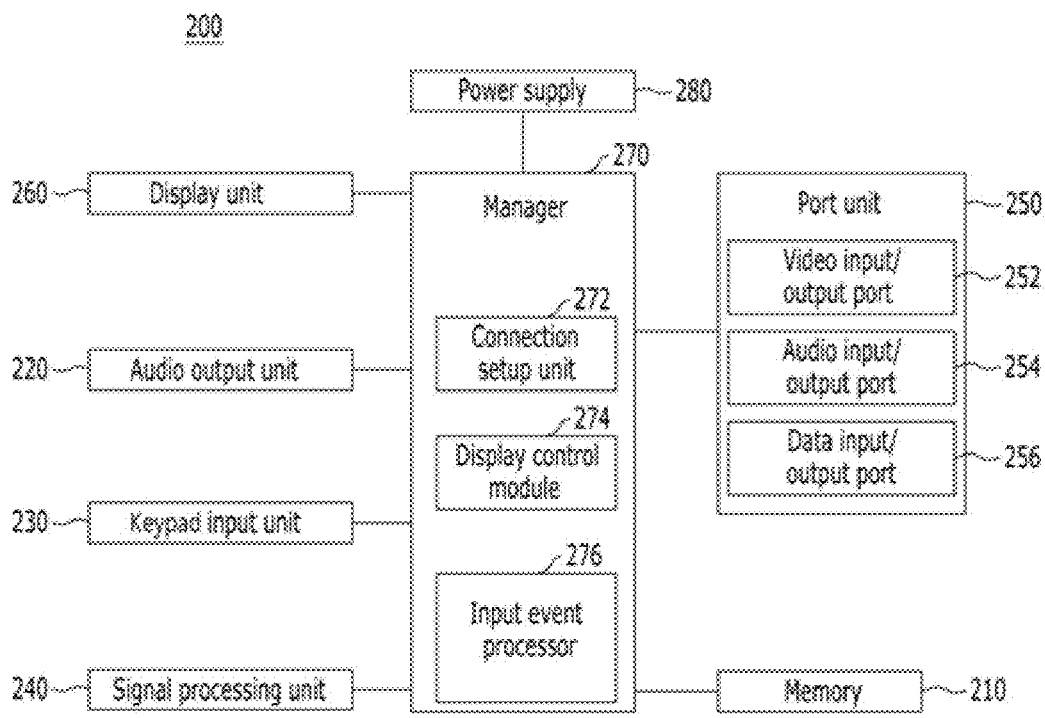
FIG. 5 is a block diagram illustrating an external device in accordance with at least one embodiment of the present invention.

FIG. 5 is a block diagram illustrating an external device in accordance with at least one embodiment of the present invention.

Referring to FIG. 5, external device 200 may include display unit 260, audio output unit 220, keypad input unit 230, signal processing unit 240, port unit 250, memory unit 210, manager 270, and power supply 280. Display unit 260, audio output unit 220, keypad input unit 230, memory 210, and power supply unit 280 may be analogous to, and perform similar functions to, display unit 160, audio output unit 165, input unit 130, internal memory unit 150, and power supply unit 190 of user equipment 100. Accordingly, the detailed description thereof will be omitted herein. For convenience and ease of understanding, only constituent elements performing distinct operations are described.

Port unit 250 may be connected to port unit 170 of user equipment 100. That is, port unit 250 may be a connecting port for forming connectivity between user equipment 100 and external device 200. Accordingly, port unit 250 may be a pair relation with port unit 170 of user equipment 100. Port unit 250 may have the same interface configuration of that of port unit 170 of user equipment 100. For example, port unit 250 may have a HDMI port, a USB port, and an audio port.

Port unit 250 may include video input/output port 252, audio input/output port 254, and data input/output port 256. Video input/output port 252 may receive image data from user equipment 100. Audio input/output port 254 may receive audio signals. Data input/output port 256 may exchange data with user equipment 100. Furthermore, port unit 250 may include a power port (not shown) for transferring power to user equipment 100 and a sensing port (not shown) for sensing connection formed between user equipment 100 and external device 200. The present invention, however, is not limited thereto. For example, port unit 250 may be connected to user equipment 100 through a radio link formed between user equipment 100 and external device 200. In this case, port unit 250 may include a signal transmitter and receiver (not shown) for communicating with each other using a communication protocol. Such communication protocol may be Bluetooth® or WiFi, for example, but the present invention is not limited thereto.

Referring back to FIG. 2, external device 200 may include coupling bay 251 in accordance with an embodiment of the present invention. Port unit 250 may be disposed on one side of coupling bay 251. Coupling bay 251 may be formed at a part of a rear side of external device 200. Coupling bay 215 may have a space for housing user equipment 100. User equipment 100 may be inserted into coupling bay 215. In accordance with an embodiment of the present invention, port unit 170 of user equipment 100 may be connected with port unit 250 of user equipment 200 when user equipment 100 is completely inserted into coupling bay 251.

Manager 270 may control overall operation for controlling constituent elements of external device 200 in response to user equipment 100 when external device 200 is coupled to user equipment 100. In accordance with an embodiment of the present invention, manager 270 may receive control data from user equipment 100 through port unit 250 and perform operation in response to the control data. Furthermore, manager 270 may receive inputs from a related user and transmit the received input to user equipment 100 through port unit 250.

Furthermore manager 270 may provide external device information to user equipment 100 when external device 200 is connected to user equipment 100. The external device information may include at least one of device type information and USB device information. User equipment 100 may identify a device type of external device 200 based on the external device information and run an application determined based on the device type of external device 200. Such application may produce operation results optimized for constituent elements of external device 200. Manager 270 may receive such operation results from user equipment 100 and control constituent elements of external device 200 based on the received operation results in accordance with embodiments of the present invention. Furthermore, manager 270 may control related constituent elements to output the received operation results in accordance with embodiments of the present invention.

Manager 270 may include connection setup unit 272, display control module 274, and input event processor 276 in accordance with an embodiment of the present invention. Connection setup unit 272 may activate the constituent elements of external device 200 when external device 200 initially senses that external device 200 is connected to user equipment 100. For example, connection setup unit 272 may supply power to the constituent elements of external device 200. That is, connection setup unit 272 may transit a waiting state of external device 200 to a wakeup state of external device 200. Accordingly, connection setup unit 272 may establish a host-device connection between user equipment 100 and external device 200.

External device 200 may provide a graphic user interface substantially identical to that displayed on user equipment 100 when external device 200 is connected to user equipment 100. In such a connected state, image data displayed on display unit 160 of user equipment 100 may be transferred to and displayed on display unit 260 of external device 200. In order to display the transferred image data on display unit 260, manager 270 may include display control module 274. Display control module 274 may turn on display unit 260 under control of manager 270 when external device 200 is connected to user equipment 100. Then, manager 274 may receive the image data displayed on display unit 160 of user equipment 100 from user equipment 100 and display the received image data on display unit 260 of external device 200.

When touch input unit 230 and keypad input unit 235 of external device 200 receive input events such as a touch input in a connected state, input event processing unit 276 may generate an event signal corresponding to the input events and transfer the generated event signal to user equipment 100. The generated event signal may be a signal for controlling operation of user equipment 100 corresponding to the received input events.

In accordance with an embodiment of the present invention, external device 200 may not operate in a disconnected mode. The disconnected mode may denote that user equipment 100 is not connected to external device 200. Accordingly, external device 200 may be a dummy device. In this case, external device 200 may include minimum elements for performing essential functions such as display control and touch input control. The present invention, however, is not limited thereto. External device 200 may be embodied as an independent device installed with an operating system (OS) that allows external device 200 operating in a standalone device. For example, external device 200 may operate as a moving image player or a MP3 player when external device 200 is not coupled to user equipment 100. When external device 200 is coupled to user equipment 100, external device 200 may perform certain operations of user equipment 100 in response to the control of user equipment 100 in accordance with embodiments of the present invention.

As described above, user equipment 100 may control external device 200 to display image data in a multiscreen display mode which is different from that of user equipment 100 in accordance with at least one embodiment of the present invention. Such operation will be described with reference to FIG. 6 to FIG. 9.

Figure 6:
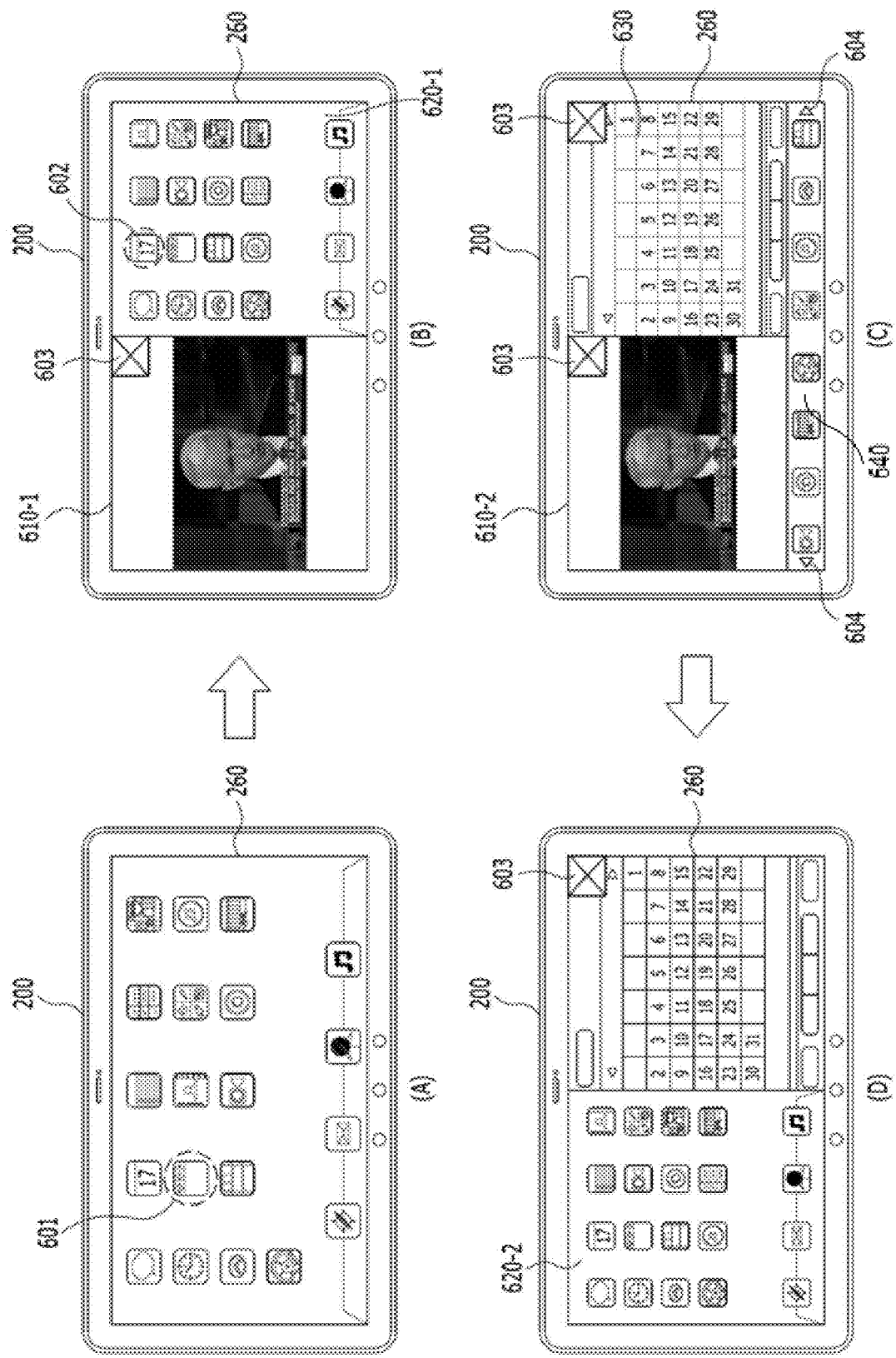
FIG. 6 shows an external device controlled to display image data in a multiscreen display mode in accordance with at least one embodiment of the present invention.
Figure 7A:
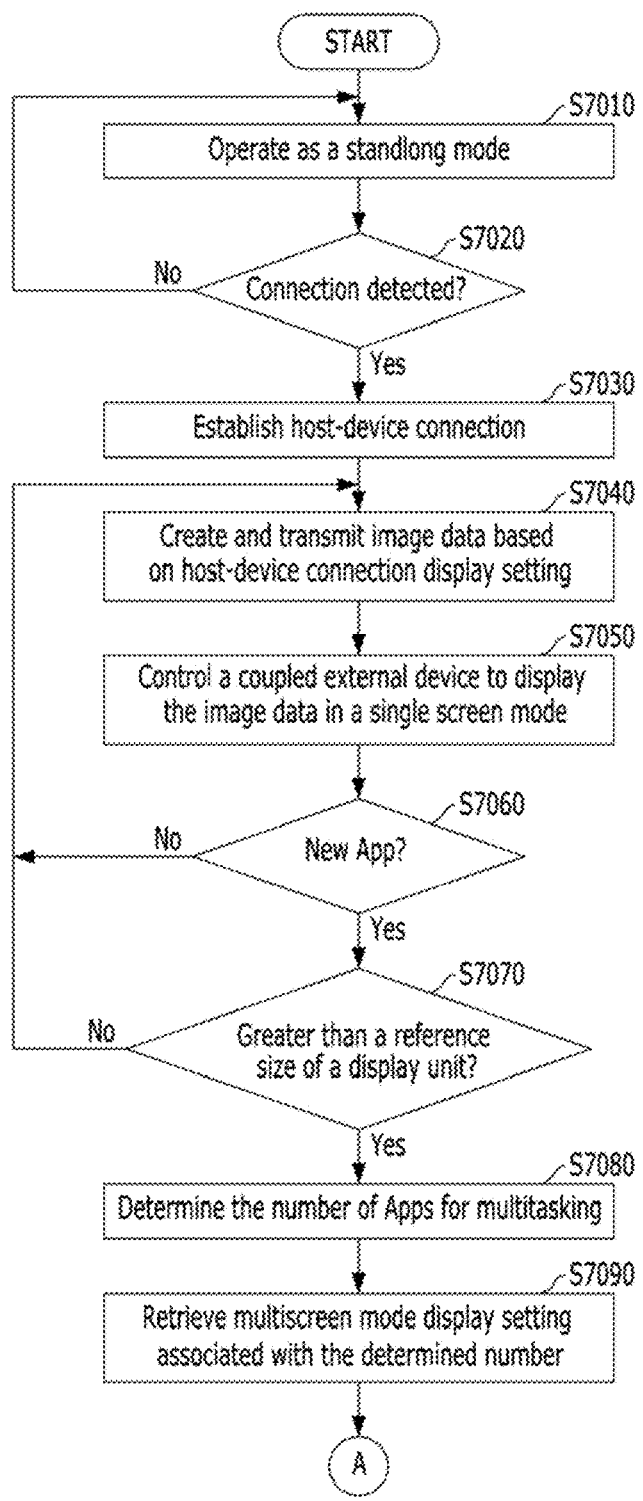
FIG. 7A to FIG. 7C show a method for dynamically controlling a display mode of an external device coupled to user equipment in accordance with at least one embodiment of the present invention.
Figure 7B:
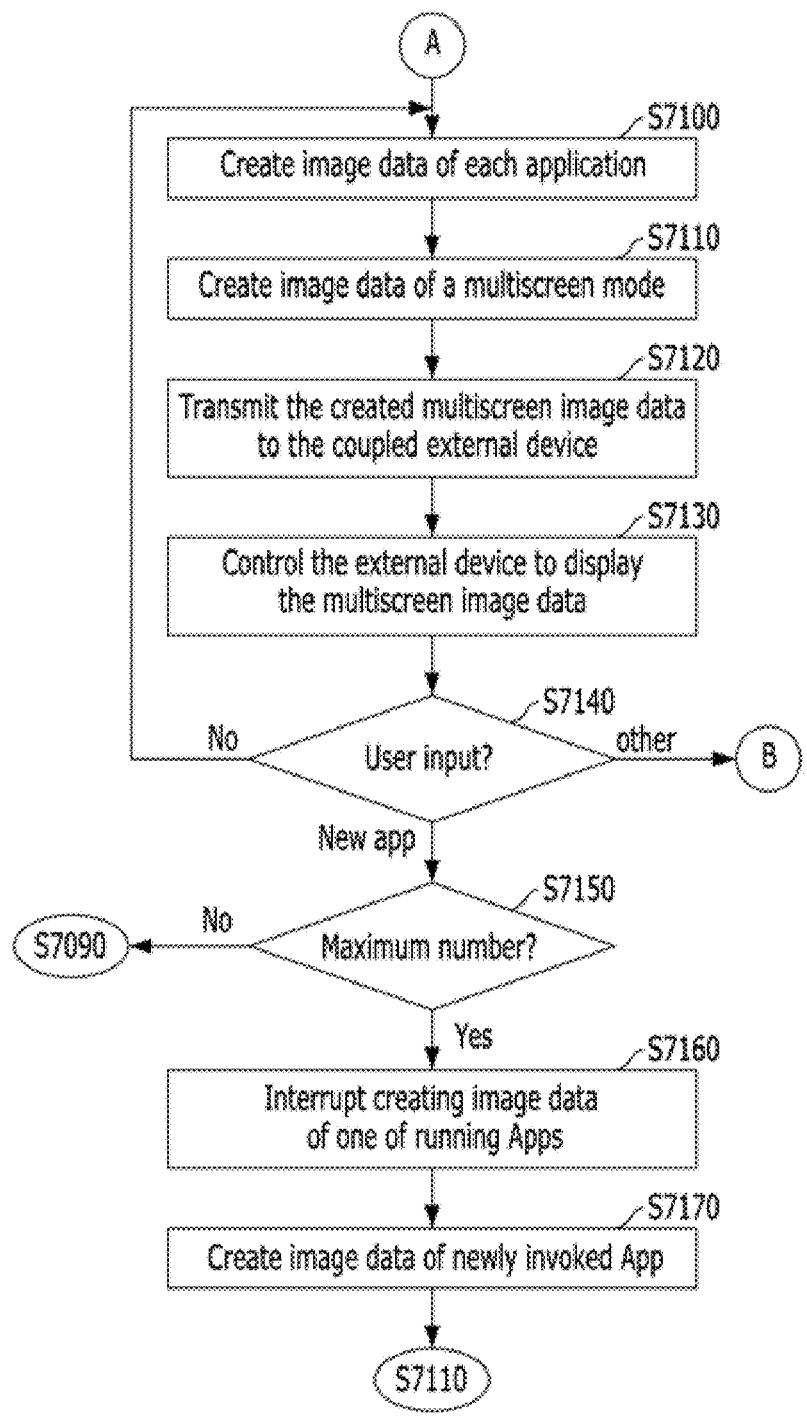
Figure 7C:
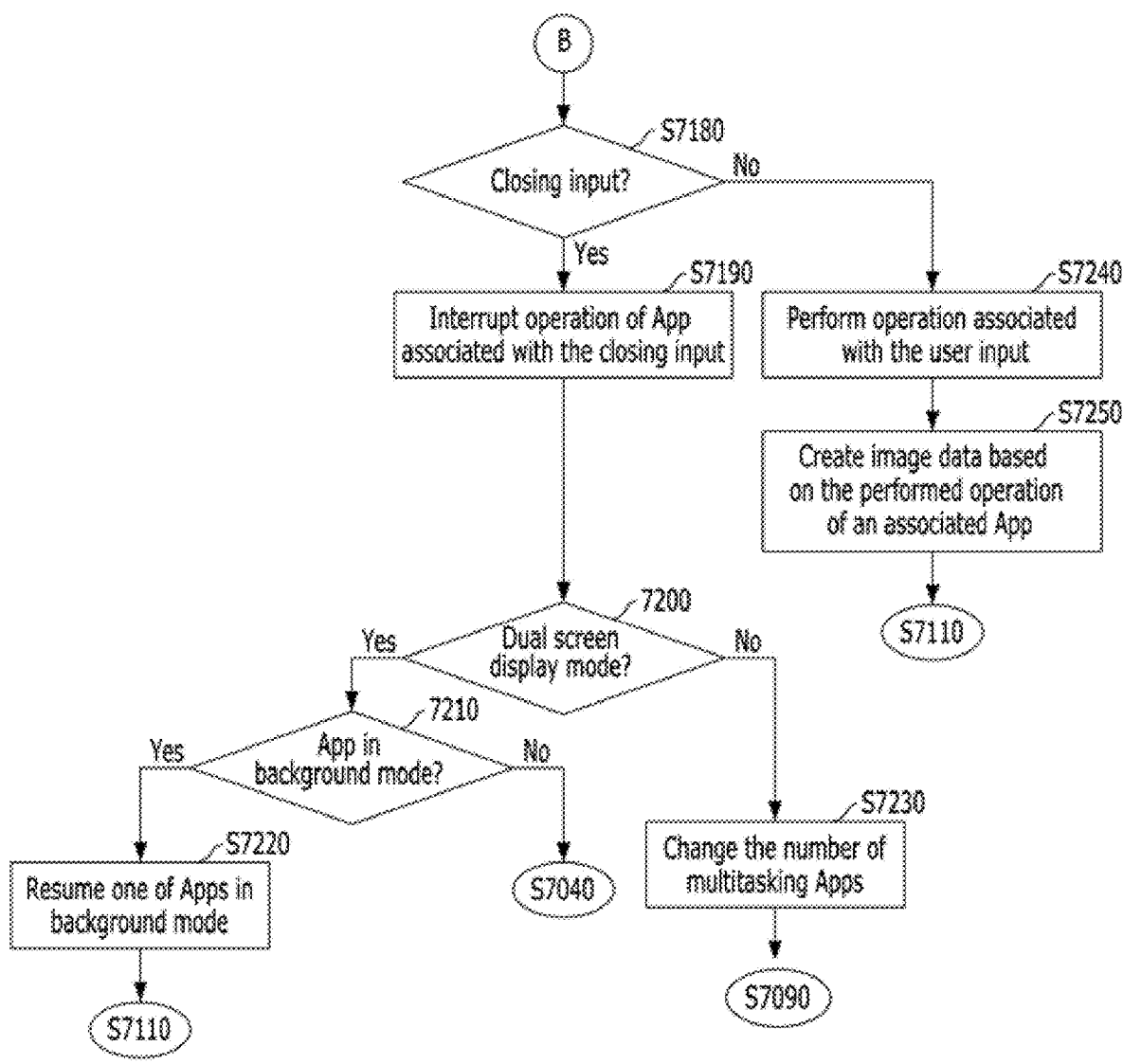

FIG. 6 shows an external device controlled to display image data in a multiscreen display mode in accordance with at least one embodiment of the present invention. FIG. 7A to FIG. 7C show a method for dynamically controlling a display mode of an external device coupled to user equipment in accordance with at least one embodiment of the present invention.

Referring to FIG. 7A, user equipment may operate as a standalone mode at step S7010. For example, user equipment 100 may perform operations in response to user inputs in a standalone mode when user equipment 100 is not coupled to external device 200. In the standalone mode, user equipment 100 may produce image data as a result of running applications (including an associated operating system) selected by a user in response to user inputs. User equipment 100 may display such produced image data on display unit 160 of user equipment 100 as a single screen display mode as shown in a diagram (A) of FIG. 2. The single screen display mode may be a display mode that displays only one application window at a time although multiple applications are in operation as a background mode. For example, typical user equipment may display only one application window associated with one that a user most recently activates among applications in operation.

At step S7020, determination may be made as to whether to detect connection to an external device. For example, when user equipment 100 is coupled to external device 200, port unit 170 of user equipment 100 may be coupled to corresponding port unit 250 of external device 200. In this case, user equipment 100 may detect such physical connection to external device 200 based on a detection signal generated at port unit 170 of user equipment 100. The present invention, however, is not limited thereto. User equipment 100 may detect connection to external device 200 based on communications with external device 200 through a wireless link. For example, user equipment 100 may detect connection to external device 200 by exchanging a request message and a response message through a wireless link. When a docking device is already coupled to user equipment 100 as a hub device and another external device is coupled to such a hub device, the docking device may detect such connection to the external device in the same manner described above. After detection, such a hub device may inform of the detected connection to user equipment 100.

When connection to an external device is not detected (No—S7020), user equipment 100 may continuously operate as the standalone mode and display image data at the single screen display mode at step S7010.

When connection to an external device is detected (Yes—S7020), host-device connection may be established at step S7030. For example, controller 180 of user equipment 100 may establish the host-device connection between user equipment 100 and external device 200. By establishing the host-device connection, an operation environment similar or about identical to that of user equipment 100 may be provided to a user through external device 200. User equipment 100 may be described as a host device in accordance with an embodiment of the present invention. The present invention, however, is not limited thereto. External device 200 connected to user equipment 100 may be a host device in accordance with another embodiment of the present invention. Such establishing the host-device connection will be described in more detail with reference to FIG. 8. During the host-device connection, a host-device connection display setting may be set based on information on a display unit of the coupled external device. Such operation will be described in more detail with reference to FIG. 8.

At step S7040, user equipment may create image data produced as a result of running applications based on the host-device connection display setting and transmit the created image data to the coupled external device. For example, user equipment 100 may create image data as a result of activated applications based on the host-device connection display setting. Such a host-device connection display setting may be set during establishing the host-device connection between user equipment 100 and external device 200. Based on the host-device connection display setting, user equipment 100 may create image data according to at least one of a screen size, a resolution, a DPI, and a display orientation of display unit 260 of external device 200. For example, when user equipment 100 is coupled to external device 200, user equipment 100 may create image data with a display orientation for display unit 260 of external device, which is different than that of display unit 160 of user equipment 100, as shown in a diagram (A) of FIG. 2. Furthermore, user equipment 100 may create image data of a certain application differently than that created for display unit 160 of user equipment 100. Particularly, when user equipment 100 creates a graphic user interface for display unit 260 of external device 200, user equipment 100 may create the graphic user interface with more menus and icons than that created for display unit 160 of user equipment 100. For example, when user equipment 100 is coupled to external device 200, user equipment 100 may create mini App tray 640 and scroll direction icons 604 within the graphic user interface, which are different than a graphic user interface displayed on r user equipment 100.

At step S7050, the coupled external device may be controlled to display the transferred image data on a display unit thereof in a single screen display mode. For example, user equipment 100 may control external device 200 to display the transferred image data on display unit 260 in the single screen display mode, as shown in diagram (A) of FIG. 6. Although external device 200 is described as simply displaying image data received from user equipment 100, the present invention is not limited thereto. For example, external device 200 may modify the image data from user equipment 100 according to own display properties and conditions and display the modified image data on display unit 260 of external device 200.

At step S7060, determination may be made as to whether a user input is an activation input for activating a new application when the user input is received from a user. For example, when user equipment 100 receives the user input from the user, user equipment 100 may determine whether the received user input is an activation input for activating one of applications installed in user equipment 100.

When the received user input is not the activation input (No—S7060), user equipment 100 may perform operations associated with the user input. Then, user equipment 100 may create and transmit image data, as a result of performing the operation, based on host-device connection display setting at step S7040 and continuously control external device 200 to display the created image data in the single screen display mode at step S7050.

When the user input is the activation input (Yes—S7060), such activation input may initiate a multitasking operation mode of user equipment 100. The multitasking operation mode may be an operating state of simultaneously running at least two applications. For example, when user equipment 100 is turned on and coupled to external device 200, an operating system of user equipment 100 may be executed and produce image data for a default home screen and display the default home screen on display unit 260 of external device 200, as shown in a diagram (A) of FIG. 6. The default home screen may be a graphic user interface (GUI) displayed on a display unit when user equipment 100 is initially turned on or when user equipment 100 is in an idle state after turned on. Such default home screen may be created by an operating system of user equipment 100. Such operating system might be considered as an application. While displaying the home screen as shown in the diagram (A) of FIG. 6, a user input may be received for activating application 601. Such user input may initiate a multitasking operation mode.

At step S7070, determination may be made as to whether a display area size of the coupled external device is greater than a reference size of a display unit when the user input is determined as the activation input (Yes—S7060). For example, user equipment 100 may determine whether the display size of external device 200 is greater than a reference display size upon the receipt of the activation input. That is, when the multitasking operation mode is initiated, user equipment 100 may determine whether the display size of external device 200 is greater than the reference display size. Such determination may be made based on information on external device 200 which is obtained while establishing the host-device connection at the step S7030.

In the step S7070, is the method determines whether external device 200 coupled to user equipment 100 has a display size suitable for displaying at least two application windows simultaneously. Each application window may be a graphic user interface produced as a result of performing an associated application. That is, it is determined whether external device 200 has a display size suitable for a multi-screen display mode in accordance with at least one embodiment of the present invention. In order to display multiple application windows in the multiscreen display mode, external device 200 may have a display size large enough for simultaneously displaying at least two application windows each of which might has a display size of user equipment 100. For example, when user equipment 100 has a display size of four inches, external device 200 may have a display size of about eight inches for suitably displaying two application windows at once. If the display size of external device 200 is not greater than about eight inches, user equipment 100 may control external device 200 to display image data in a single screen display mode.

Such a reference display size may be decided in consideration of various factors including a display size of user equipment 100, a size of one application window, and a typical display size of each type of external devices. The reference display size may be set by a manufacturer of user equipment 100. In this case, such reference display size may be decided in a designing process of user equipment 100 and stored in user equipment 100. Furthermore, the reference display size may be dynamically set by each user of user equipment 100. For example, a user interface may be provided to user to input a reference display size. A related user may input a predetermined display size such as about ten inches as the reference display size. In general, a tablet PC may a display size of about ten inches. Alternatively, a user interface may be provided to a user to select at least one of an external device type such as a desktop personal computer (PC), a tablet PC, a laptop PC, or a TV. A related user may input a predetermined external device type and a typical display size of the selected external device type may be set as the reference display size. Such user interface for setting the reference display size may be provided after user equipment 100 is coupled to external device 200. That is, a related user may change the reference display size after user equipment 100 is coupled to external device 200.

Furthermore, the step S7070 may be omitted in another embodiment of the present invention. For example, when a new application is activated, user equipment 100 may control external device 200 to display at least two application windows in the multiscreen display mode without considering the display size of external device 200. In addition, instead of the step S7070, user equipment 100 may provide another user interface for enabling a user to select one of a single screen display mode and a multiscreen display mode after a new application is activated while displaying an application window in a single display mode. As described above, switching between a single screen display mode and a multiscreen display mode may be performed through various methods in accordance with at least one embodiment of the present invention.

When the display size of external device 200 is not greater than the reference display size (No—S7060), user equipment 100 may create image data of the newly activated application based on the host-device connection display setting, transmit the created image data to external device 200 at step S7040, and control external device 200 to display the image data in the single screen mode a step S7050. Particularly, when external device 200 has a display size not enough to simultaneously display at least two application windows, user equipment 100 may control external device 200 to display the same screen that user equipment 100 displays on display unit 160 of user equipment 100 (i.e., mirrored screen) but based on the host-device connection display setting.

At step S7080, the number of applications for the multitasking operation mode may be determined when the display size of external device 200 is greater than the reference display size (Yes—S7060). For example, user equipment 100 may determine the number of applications to be performed as the multitasking statue. According to the determined number of applications, user equipment 100 may decide the number of application windows to be displayed in the multiscreen display mode in accordance with at least one embodiment of the present invention.

At step S7090, multiscreen mode display setting associated with the determined number may be obtained. For example, user equipment 100 may obtain information on multiscreen mode display setting associated with the determined number of applications to be performed in the multitasking statue. That is, user equipment 100 may retrieve such a multiscreen mode display setting from memory 150 of user equipment 100. The multiscreen mode display setting may denote display properties for displaying at least two application windows in the multiscreen display mode. For example, the multiscreen mode display setting may include various display properties such as the number of application windows in a multiscreen display mode, a display size of each application window, a position and a display orientation of each application window, arrangement of each application window, control menus and icons for controlling an overall graphic user interface of the multiscreen display mode and each application window, and arrangement and sizes of the control menus and icons, but the present invention is not limited thereto. For example, a diagram (C) of FIG. 6 may show two application windows displayed in a dual screen display mode. As shown, two application windows 610-2 and 630 are displayed each in two divided display areas of display unit 260 of external device 200. Furthermore, closing icon 603 and mini app tray 640 are displayed with two application windows 610-2 and 630. Such arrangement, sizes, and display orientations of two application windows 610-2 and 630 and the control menus and icons may be determined based on the retrieved multiscreen mode display setting in accordance with at least one embodiment of the present invention. Such multiscreen mode display setting may be stored in memory 150 in a form of a mapping table. Based on the determined number of applications in the multitasking status, related multiscreen display setting may be retrieved. For example, when two applications are running in the multitasking statue, multiscreen display setting associated with a dual screen display mode may be retrieved from memory 150.

The multiscreen mode display setting may be determined based on various parameters of user equipment 100 and external device 200 coupled to user equipment 100. For example, the multiscreen mode display setting may be determined based on a processing power and a memory size of user equipment 100 and a display size of external device 200. That is, the processing power and the memory size of user equipment 100 may be used to determine the maximum display size of external device 200 because the maximum display area of external device 200 may differ according to the processing power and the memory of user equipment 100. Furthermore, the display size of external device 200 may be considered to determine the maximum number of application windows in the multiscreen display mode. For example, when the display size of external device 200 is larger than about 20 inches, at least four application windows may be displayed in the multiscreen mode. However, it may be difficult to display more than two application windows in the multiscreen display mode when the display size of external device 200 is smaller than about 10 inches. The multiscreen mode display setting may be determined and stored in user equipment 100 by a related manufacturer, but the present invention is not limited thereto. For example, the multiscreen mode display setting may be determined and stored in user equipment 100 by a related user. In this case, user equipment 100 may provide a user interface or an application for setting such multiscreen mode display setting. The information of the multiscreen mode display setting may be stored in memory 150 in a form of a lookup table, but the present invention is not limited thereto. For example, user equipment 100 may obtain such multiscreen mode display setting from other entity through a communication network in associated with an external device coupled to user equipment 100. That is, user equipment 100 may obtain information on the coupled external device upon the connection to the external device and request an associated multiscreen mode display setting to a related web server through a communication network. In response to the request, user equipment 100 may obtain the associated multiscreen mode display setting from the related web server.

At step S7100, image data of each application may be generated based on the obtained multiscreen mode display setting. For example, user equipment 100 may create image data as a result of running each application in response to user inputs associated with each application. Furthermore, user equipment 100 may refer related information in the obtained multiscreen mode display setting for creating each application window, such as a display size and a display orientation of each application window. As shown in a diagram (B) of FIG. 6, user equipment 100 may create image data for application window 620-1 and create image data for application window 610-1. The image data for application window 610-1 may be produced as a result of activating application icon 601.

Referring to FIG. 7B, image data of a multiscreen display mode may be created based on the obtained multiscreen mode display setting at step S7110. For example, user equipment 100 may combine the created image data of each application window and create control menu and icons based on the obtained multiscreen mode display setting in accordance with at least one embodiment of the present invention. That is, user equipment 100 may create multiscreen image data by combining the created image data for application window 610-1 and the created image data for application window 620-1 based on the obtained multiscreen mode display setting as shown in a diagram (B) of FIG. 6.

At step S7120, the created multiscreen image data may be transferred to the coupled external device. For example, user equipment 100 may transmit the created multiscreen image data to external device 200.

At step S7130, the coupled external device may be controlled to display the multiscreen image data. For example, user equipment 100 may control external device 200 to display the multiscreen image data as shown in the diagram (B) of FIG. 6. That is, user equipment 100 may control external device 200 to simultaneously display application window 610-1 and another application window 620-1 in a dual screen display mode as shown in the diagram (B) of FIG. 6.

At step S7140, user equipment 100 may determine a type of a user input upon the receipt of the user input. When user input is not received (No—S7140), user equipment 100 may continuously display application windows in the multiscreen mode at step S7100 to S7130.

When the received user input is an activation input for activating a new application (New app—S7140), user equipment 100 may determine whether the number of application windows associated with the current multiscreen display mode reaches the maximum number of application windows allowed within the current multiscreen display mode at step S7150. The maximum number may also denote the maximum number of application windows allowed to be displayed at once within the current multiscreen display mode. Such information may be included in the multiscreen mode display setting, but the present invention is not limited thereto. For example, when a related user activates application icon 602 in application window 620-1 while displaying the multiscreen image data as shown in the diagram (B) of FIG. 6, user equipment 100 may determine whether the number of multitasking application windows reaches the maximum number based on the associated multiscreen mode display setting.

When the number of the multitasking application windows is not equal to the maximum number (No—S7150), the step S7090 may be performed. For example, the previous number of application windows in the multiscreen display mode may be increased by one and a multiscreen mode display setting may be newly obtained based on the updated number of application windows. Then, image data may be created based on the obtained multiscreen mode display setting at step S7100 to S7130.

When the number of application windows reaches the maximum number (Yes—S7150), user equipment 100 may interrupt creating image data of one of previously activated applications at step S7160. For example, external device 200 may have two as the maximum number of application windows allowed to be displayed in a multiscreen display mode because of a display size of external device 200. Such information may be included in the associated multiscreen mode display setting. When application icon 602 is activated while application window 610-1 and application window 620-1 are displayed in a dual screen mode, the number of application windows reaches the maximum number because the number of application windows in the current multiscreen display mode and the maximum number is two. In this case, user equipment 100 may interrupt one of applications to create image data thereof. Such interrupted application may be selected by various conditions. For example, an operating system may be the first one to be interrupted. Alternatively, the oldest one of the activated applications, except the operating system, may be selected and interrupted to create image data, but the present invention is not limited thereto. In case of the diagram (B) of FIG. 6, the operating system is interrupted to create image data thereof. Although the selected application is interrupted to create image data, operation of the selected application is not interrupted. The selected application may be still running in a background mode.

At step S7170, image data of the newly activated application may be generated. For example, user equipment 100 may produce image data of the newly activated application associated with the activated application icon 602 of the diagram (B) of FIG. 6. That is, image data for application window 630 (diagram (C) of FIG. 6) is produced. Using the produced image data, user equipment 100 may create image data of the multiscreen display mode and control external device 200 to display the created image data in the multiscreen display mode at step S7110 to S7130. For example, application window 610-2 and application window 630 may be displayed in the dual screen display mode as shown in the diagram (C) of FIG. 6. Furthermore, control menus 640 and icons 603 and 604 may be further displayed with application windows 610-2 and 630 based on the associated multiscreen mode display setting as shown in the diagram (C) of FIG. 6.

Referring to FIG. 7C, user equipment 100 may determine whether the user input is a closing input for closing one of application windows displayed in the multiscreen mode at step S7180 when the received user input is not the activation input (Other—S7140). For example, the closing input may be initiated by clicking closing icon 603 shown in the diagram (C) of FIG. 6.

When the user input is the closing input (Yes—S7180), user equipment 100 may interrupt creating image data of the application window associated with the closing input at step S7190. For example, when closing icon 603 of application window 610-2 is activated (diagram (C) of FIG. 6), user equipment 100 may interrupt creating image data of the application associated with application window 610-2. As described, the application may be running in a background mode.

At step S7200, user equipment 100 may determine whether the associated multiscreen display mode is a dual screen display mode. When the associated multiscreen display mode is the dual screen display mode as shown in the diagram (C) of FIG. 6 (Yes—S7200), user equipment 100 may determine whether any application is running in the background mode at step S7210.

When there is an application running in the background mode (Yes—S7210), user equipment 100 may resume one of the applications running in the background mode to create image data at step S7220. When multiple applications are running in the background mode, one lastly interrupted may be selected to be resumed, but the present invention is not limited thereto. Although multiple applications are running in the background mode, the operating system of user equipment 100 may be selected as an application to be resumed as shown in a diagram (D) of FIG. 6. After resuming, the created image data may be combined and displayed as the dual screen display mode at the steps S7110 to S7130. As shown in the diagram (D) of FIG. 6, application window 6230-2 of the operating system may be resumed and displayed with application window 603 of the lastly activated application in the dual screen mode.

When no application is running in the background mode (No—S7210), user equipment 100 may create and transmit image data of remaining application based on the host-device connection display setting at step S7040 and control external device 200 to display the created image data in the single screen display mode at step S7050.

Furthermore, when the associated multiscreen display mode is not the dual screen mode (No—S7200), user equipment 100 may decrease the number of applications in the multitasking operation mode by one at step S7230. Using the decreased application number, user equipment 100 may obtain an associated multiscreen mode display setting at step S7090 and control external device 200 to display remaining application windows in the multiscreen mode at steps S7100 to S7130.

When the user input is not the closing input (No—S7180), user equipment 100 may perform operation related to the user input at step S7240 and create image data of an associated application window based on a result of the performed operation at step S7250. Then, user equipment 100 may continuously control external device 200 to display the application windows in the multiscreen mode at steps S7100 to S7130.

As described, the multiscreen display mode is described as being initiated without consideration of a type of application in accordance with at least one embodiment of the present invention. The present invention, however, is not limited thereto. For example, a type of an activated application may be considered to initiate the multiscreen display mode in accordance with another embodiment of the present invention. Particularly, a multiscreen display mode may be initiated only when a user activates a designated application such as an Internet browser, an image viewer, a moving image player, and a documenter editor. Furthermore, a multiscreen display mode may be initiated only when a user activates two related applications such as an Internet browser with a document editor and an image viewer with an email writer. As described, the initiation of the multiscreen display mode may be set in various methods.

As described, external device 200 is described as being controlled to display an overall graphic user interface (GUI) of a multiscreen display mode in a landscape orientation and each application window of the overall GUI in a portrait orientation, but the present invention is not limited thereto. Such orientation may be controlled differently in accordance with another embodiment of the present invention. For example, one of application windows may be displayed in a portrait orientation and the other may be displayed in a landscape orientation while the overall GUI of the multiscreen display mode in a portrait orientation. Such display orientations of the overall GUI of the multiscreen display mode and each application window may be set in the multiscreen mode display setting. Furthermore, external device 200 is described as being controlled to display the overall GUI of a multiscreen display mode in a landscape orientation and a display area of external device 200 is described as being divided into a left display area and a right display area. The present invention, however, is not limited thereto. For example, external device 200 may be controlled to display a multiscreen display mode in a portrait orientation and the display area of external device 200 may be divided into a top display area and a bottom display area in accordance with another embodiment of the present invention.

Furthermore, the display area of external device 200 is described as being divided evenly, but the present invention is not limited thereto. For example, the display area of external device 200 may be divided unevenly according to a type of each application running in a multitasking mode.

After detecting the connection to the external device, the host-device connection may be established as described in step S7030 of FIG. 7A. Such operation will be described in more detail with reference to FIG. 8.

FIG. 8 shows a method for establishing host-device connection at least one embodiment of the present invention.

Referring to FIG. 8, when the detection of the connection to external device 200 is detected (Yes—S7020 of FIG. 7A), an operation mode may be changed to a connected mode at step S8010. For example, controller 180 may change the operation mode to the connected mode when controller 180 senses the connection to external device 200. The connected mode may be opposite to a standalone mode or a disconnected mode. The connected mode may denote an operation mode of user equipment 100 when user equipment 100 is coupled to external device 200.

At step S8020, display device information of external device may be obtained. For example, the display device information of external device 200 may include information on a screen size, a resolution, a display orientation, and a dot per inch (DPI) of display unit 260 of external device 200. Such display device information may be obtained through a request. Particularly, user equipment 100 may request display unit information to external device 200 and obtain the display unit information from external device 200. Alternatively, user equipment 100 may identify a display unit type of external device 200 and retrieve related display unit information from internal memory 150. Particularly, agent 182 may request and receive display unit information from external device 200. Based on the display unit information, agent 182 may identify hardware specification of display unit 260 of external device 200. For example, agent 182 may receive extended display identification data (EDID) from external device 200. The EDID may be information on hardware specification of display unit 260 of external device 200. The EDID may include information on a manufacturer, a model number, an EDID version, an appropriate DPI value, a screen size, supporting screen resolutions, luminance, and the number of pixels. The present invention, however, is not limited thereto. For example, user equipment 100 may store, in internal memory 150, display unit information of candidate external devices that might be connected to user equipment 100. The stored display unit information may be mapped to a device ID of each candidate external device. Such mapping information may be managed by agent 182 of user equipment 100. In this case, user equipment 100 may receive or recognize a device ID of external device 200. Based on the device ID, user equipment 100 may obtain the display unit information of display unit 260 of external device 200 from the stored display unit information.

At step S8030, determination may be made as to whether it is necessary to reconfigure initial display settings based on the obtained display device information. For example, controller 180 may determine whether it is necessary to reconfigure an initial display setting based on the obtained information.

When it is necessary to reconfigure the initial display setting (Yes—S8030), the initial display setting may be reconfigured based on the obtained display device information as a host-device connection display setting at step S8040. For example, controller 180 may reconfigure the initial display setting based on the obtained display device information of external device 200. After reconfiguration, the host-device connection display setting is stored in memory 150 of user equipment 100.

When reconfiguration is not necessary (No—S8030), the initial display setting may be used as the host-device connection display setting without modification at step S8050. For example, controller 180 may store the initial display setting as the host-device connection display setting in memory 150 of user equipment 100.

The host-device connection display setting stored in memory 150 may be retrieved and used for displaying the image data on the coupled external device at step S7110 (FIG. 7) in accordance with at least one embodiment of the present invention.

When user equipment 100 operates in a standalone mode, user equipment 100 may display image data based on the initial display setting of display unit 160 of user equipment 100. After user equipment 100 is connected to external device 200, user equipment 100 may display the image data on display unit 260 of external device 200 based on the host-connection display setting. User equipment 100 may be required to reconfigure the initial display setting based on a resolution of display unit 260 of external device 200. When a resolution of display unit 260 of external device 200 is identical to or compatible to that for display unit 160 of user equipment 100, reconfiguration of image data may not be necessary.

In addition to the resolution, displaying setting may be reconfigured based on other parameters included in the obtained display device information, for example, a screen size, a display orientation, and a DPI. For example, display unit 160 of user equipment 100 may have a screen size different from display unit 260 of external device 200. In this case, such display setting may be reconfigured based on the screen size for display unit 260 of external device 200.

Furthermore, it may be necessary to modify image data produced for display unit 160 of external device 200, to be suitable for display unit 260 of external device 200. In this case, video processing unit 140 may process the image data based on the display setting, including a screen size, a display orientation, and a DPI, suitable for display unit 260 of external device 200 and transmit the processed image data to external device 200. Alternatively, controller 180 may transmit image data created for display unit 160 of user equipment 100 to external device 200 without reconfiguration and external device 200 may reconfigure the received image data based on a DPI for display unit 260 of external device 200. Such operation may be performed through signal processing unit 240 of external device 200.

In accordance with at least one embodiment of the present invention, display unit 260 of external device 200 may optimally display images through reconfiguring image data based on a resolution and a DPI of display unit 260 of external device 200. In addition to the resolution and the DPI, a display orientation may be considered to create or to reconfigure image data in accordance with embodiments of the present invention.

For example, user equipment 100 such as a smart phone may have a portrait display orientation as a default display orientation. External devices 200 such as laptop notebook or tablet PC, known as a smart pad, may have a landscape display orientation as a default display orientation. When such a default display orientation is different between user equipment 100 and external device 200, agent 182 may i) obtain information on a default display orientation of display unit 260 of external device 200 based on the obtained display unit information including a resolution, a screen size, and product identification and ii) determine whether the default display orientation of external device 200 is identical to or different from that of user equipment 100 based on the obtained display device information. When the default display orientation is not identical, and controller 180 may reconfigure image data based on the default display orientation of external device 200 in addition to the resolution and the DPI of external device 200.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a controlling unit, a controlling unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose controlling unit, the program code segments combine with the controlling unit to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of dynamically controlling, by user equipment having a single display unit, a display mode of an external device coupled to the user equipment, the method comprising:

establishing a host-device connection between the user equipment and the external device upon detecting a connection of the user equipment to the external device;

creating, by the user equipment, first image data produced by a first application based on a host-device connection display setting, transmitting the first image data to the coupled external device and controlling the coupled external device to display the first image data in a single screen mode;

receiving a user input on the user equipment to initiate a multitasking operation to activate a second application among inactive applications while displaying the first image data on the coupled external device in the single screen mode, i) determining, by the user equipment, a multiscreen mode display setting of the coupled external device based on a total number of active applications producing image data to be displayed within the multiscreen mode display setting, a size of a display unit of the coupled external device, and multitasking the first application and the second application, ii) creating, by the user equipment, multiscreen image data based on the determined multiscreen mode display setting, iii) transmitting the multiscreen image data to the coupled external device and iv) controlling the coupled external device to display the multiscreen image data in a multiscreen mode, wherein the determined multiscreen mode display setting includes a display size and a display position of each application window to be displayed in the multiscreen mode on the coupled external device;

wherein the multiscreen image data includes i) a first application window that displays reconfigured first image data produced by reconfiguring the first image data based on the determined multiscreen mode display setting, and ii) a second application window that displays the second image data produced by the second application, and wherein the method further comprises:
retrieving, from a memory of the user equipment, information on an image data transfer option associated with the first application, the second application, and the coupled external device, and selectively transferring the first image data and the second image data produced in the user equipment to the coupled external device based on the image data transfer option associated with the first application and the second application, wherein the image data transfer option is set in association with each application installed in the user equipment according to the coupled external device and includes information on whether to transfer data produced by an associated application to the coupled external device or restrict the produced data from transferring.

2. The method of claim 1, wherein:
the first image data is a single application window that displays one of i) image data produced for a default home screen and ii) image data produced by a previously activated application before the host-device connection; and the multiscreen image data further includes control menus and icons for controlling an overall graphic user interface of the multiscreen display mode and each application window.

3. The method of claim 1, wherein the determining includes: obtaining the determined multiscreen mode display setting associated with the determined total number of applications from a mapping table stored in a memory of the user equipment.

4. The method of claim 1, further comprising:
upon receiving a user input for activating one of inactive applications, determining whether a display size of the display unit of the coupled external device is greater than a reference display size;
when the display size of the coupled external device is determined as being greater than a reference display size, creating the multiscreen image data based on the determined multiscreen mode display setting and controlling the coupled external device to display the multiscreen image data in the multiscreen display mode,
otherwise, creating third image data produced by the newly activated application based on the host-device connection display setting, transmitting the third image data to the coupled external device, and controlling the coupled external device to display the third image data in the single screen mode.

5. The method of claim 1, wherein the creating the multiscreen image data includes:
creating the first image data based on information related to a first application window in the determined multiscreen mode display setting;
creating the second image data based on information related to a second application window in the determined multiscreen mode display setting;
creating menu image data of control menus and icons for controlling an overall graphic user interface of the multiscreen display mode, the first application window, and the second application window; and
transmitting the first image data, the second image data, and the menu image data to the coupled external device; and
controlling the coupled external device to display the first image data in the first application window, to display the second image data in the second application window, and to display the menu image data in predetermined positions based on the determined multiscreen mode display setting.

6. The method of claim 1, wherein the creating the multiscreen image data includes:
creating multiscreen image data by combining the first image data, image data produced by the newly activated application, and menu image data based on the obtained multiscreen mode display setting;
transmitting the created multiscreen image data to the coupled external device; and
controlling the coupled external device to display the transmitted multiscreen mode image data in a multiscreen display mode based on the determined multiscreen mode display setting.

7. The method of claim 1, wherein the multiscreen mode display setting includes at least one of information on a number of application windows in the multiscreen display mode, a maximum number of allowed application windows, the display size of each application window, the display position and a display orientation of each application window, arrangement of each application window, control menus and icons for controlling an overall graphic user interface of the multiscreen display mode and each application window, arrangement and sizes of the control menus and icons.

8. The method of claim 1, wherein:
the determining a multiscreen mode display setting includes retrieving, from a lookup table stored in a memory of the user equipment, the multiscreen mode display setting associated with the determined total number of applications running in the user equipment and a size of the display unit of the coupled external device.

9. The method of claim 7, wherein the multiscreen mode display setting is determined based on the number of multitasking applications running in the user equipment and the information on the coupled external device.

10. The method of claim 1, further comprising:
determining whether a user input is received for activation of a third application after controlling the coupled external device to display the multiscreen image data produced in the user equipment in the multiscreen display mode;
upon the receipt of the user input for activation of the third application, interrupting creating one of the reconfigured first image data and the second image data;
creating third image data produced by the third application based on the determined multiscreen mode display setting and continuously creating uninterrupted one based on the multiscreen display mode;
creating multiscreen image data by combining the created third image data and the continuously created uninterrupted one based on the determined multiscreen mode display setting;
transmitting the created multiscreen image data to the coupled external device; and
controlling the coupled external device and displaying the transmitted multiscreen image data in the multiscreen display mode.

11. The method of claim 10, wherein the determining includes:
upon the receipt of the user input for activating the third application, determining whether a number of application windows in a current multiscreen display mode reaches a maximum number of application windows allowed within the current multiscreen display mode;
when the number of application windows in the current multiscreen display mode is less than the maximum number, obtaining a multiscreen mode display setting by increasing a number of associated multitasking applications by one;
creating multiscreen image data based on the newly obtained multiscreen mode display setting by additionally including the third image data produced by the third application; and
transmitting the created multiscreen image data to the coupled external device and controlling the external device and displaying the transmitted multiscreen image data based on the newly obtained multiscreen mode display setting.

12. The method of claim 1, further comprising:
determining whether a user input is received for closing one of application windows in the multiscreen display mode after controlling the coupled external device to display image data produced in the user equipment in the multiscreen display mode;

upon the receipt of the user input for closing one of application windows, interrupting creating image data of the application associated with the user input;

resuming one of applications running in a background mode to create image data and continuously creating image data of applications not associated with the user input;

creating multiscreen image data by combining the created image data of the resumed application and the continuously created image data of the applications not associated with the user input based on an associated multiscreen mode display setting; and transmitting the created multiscreen image data to the coupled external device, wherein the controlling includes:
controlling the coupled external device and displaying the transmitted multiscreen image data in the associated multiscreen display mode based on the associated multiscreen mode display setting.

13. The method of claim 1, wherein the selectively transferring comprises: transferring image data produced by one application running in the user equipment to the coupled external device when an associated image data transfer option is set as a positive image data option according to the coupled external device, and restricting image data produced by one application running in the user equipment from transferring to the coupled external device when an associated image data transfer option is set as a negative image data option according to the coupled external device.

14. A user equipment having a single display unit for dynamically controlling a display mode of an external device coupled thereto, the user equipment comprising:

a memory configured to store information necessary for operating the user equipment and performing operations;

a communication circuit configured to communicate with other parties through a communication link;

a display unit configured to display information produced by at least one application installed in the user equipment;

at least one port configured to be connected with the external device and exchange signals and data with the external device;

at least one processor configured to control operations for dynamically controlling the external device to display the information in a display mode different from that of the user equipment upon detection of connection to the external device;

wherein the at least one processor is configured to:
establish a host-device connection to the external device when the user equipment detects connection to the external device;

create a first image data produced by a first application based on a host-device connection display setting, transmit the first image data to the coupled external device and control the coupled external device to display the first image data in a single screen mode;

upon receiving a user input on the user equipment to initiate a multitasking operation to activate a second application among inactive applications while displaying the first image data on the coupled external device in the single screen mode i) determine a multiscreen mode display setting of the coupled external device based on a total number of active applications producing image data to be displayed within the multiscreen mode display setting, a size of a display unit of the coupled external device, and multitasking the first application and the second application, ii) create multiscreen image data based on the determined multiscreen mode display setting, iii) transmit the multiscreen image data to the coupled external device, and iv) control the coupled external device to display the multiscreen image data in a multiscreen display mode, wherein the determined multiscreen mode display setting includes a display size and a display position of each application window to be displayed in the multiscreen display mode on the coupled external device;

wherein the multiscreen image data includes i) a first application window that displays reconfigured first image data produced by reconfiguring the first image data based on the determined multiscreen mode display setting, and ii) a second application window that displays the second image data produced by the second application, wherein the at least one processor is further configured to:
retrieve, from a memory of the user equipment, information on an image data transfer option associated with the first application, the second application, and the coupled external device, and selectively transfer the first image data and the second image data produced in the user equipment to the coupled external device based on the image data transfer option associated with the first application and the second application, and wherein the image data transfer option is set in associated with each application installed in the user equipment according to the coupled external device and includes information on whether to transfer data produced by an associated application to the coupled external device or restrict the produced data from transferring.

15. The user equipment of claim 14, wherein the processor is configured to:
obtain the determined multiscreen mode display setting associated with the determined total number of applications from a mapping table stored in a memory of the user equipment.

16. The user equipment of claim 14, wherein the processor is configured to:
create the first image data based on information related to a first application window in the determined multiscreen mode display setting;

create the second image data based on information related to a second application window in the determined multiscreen mode display setting;

create menu image data of control menus and icons for controlling an overall graphic user interface of the multiscreen display mode, the first application window, and the second application window; and transmit the first image data, the second image data, and the menu image data to the coupled external device; and control the coupled external device to display the first image data in the first application window, to display the second image data in the second application window, and to display the menu image data in predetermined positions based on the determined multiscreen mode display setting.

17. The user equipment of claim 14, wherein the multiscreen mode display setting includes at least one of information on a number of application windows in the multiscreen display mode, a maximum number of allowed application windows, the display size of each application window, the display position and a display orientation of each application window, arrangement of each application window, control menus and icons for controlling an overall graphic user interface of the multiscreen display mode and each application window, and arrangement and sizes of the control menus and icons.

18. The user equipment of claim 14, wherein the processor is configured to:
   upon the receipt of the user input for activating the third application, determine whether a number of application windows in a current multiscreen display mode reaches a maximum number of application windows allowed within the current multiscreen display mode;
   when the number of application windows in the current multiscreen display mode is less than the maximum number, obtain a multiscreen mode display setting by increasing a number of associated multitasking applications by one;
   create multiscreen image data based on the newly obtained multiscreen mode display setting by additionally including the third image data produced by the third application; and
   transmit the created multiscreen image data to the coupled external device and control the external device and displaying the transmitted multiscreen image data based on the newly obtained multiscreen mode display setting.

19. The user equipment of claim 14, wherein the processor is configured to:
   determine whether a user input is received for closing one of application windows in the multiscreen display mode after controlling the coupled external device to display image data produced in the user equipment in the multiscreen display mode;
   upon the receipt of the user input for closing one of application windows, interrupt creating image data of the application associated with the user input;
   resume one of applications running in a background mode to create image data and continuously create image data of applications not associated with the user input;
   create multiscreen image data by combining the created image data of the resumed application and the continuously created image data of the applications not associated with the user input based on an associated multiscreen mode display setting;
   transmit the created multiscreen image data to the coupled external device; and
   control the coupled external device and display the transmitted multiscreen image data in the associated multiscreen display mode based on the associated multiscreen mode display setting.

* * * * *